United States Patent [19]

Sharp

[11] Patent Number: 5,870,159
[45] Date of Patent: Feb. 9, 1999

[54] SWITCHABLE ACHROMATIC POLARIZATION ROTATOR

[75] Inventor: Gary D. Sharp, Boulder, Colo.

[73] Assignee: KAJ, Longmont, Colo.

[21] Appl. No.: 549,963

[22] Filed: Oct. 30, 1995

[51] Int. Cl.$^6$ .............................. G02F 1/1335
[52] U.S. Cl. ...................... 349/121; 349/117
[58] Field of Search .................... 349/117, 171, 349/100, 102, 121

[56] References Cited

U.S. PATENT DOCUMENTS

| | | | |
|---|---|---|---|
| 4,711,530 | 12/1987 | Nakanowatari et al. | 350/339 R |
| 4,770,500 | 9/1988 | Kalmanash et al. | 350/347 E |
| 4,884,876 | 12/1989 | Lipton et al. | 350/347 E |
| 5,033,825 | 7/1991 | Ishikawa et al. | 350/339 R |
| 5,089,905 | 2/1992 | Sasaki et al. | 359/64 |
| 5,132,826 | 7/1992 | Johnson et al. | 359/93 |
| 5,187,603 | 2/1993 | Bos | 359/73 |
| 5,231,521 | 7/1993 | Johnson et al. | 359/93 |
| 5,237,438 | 8/1993 | Miyashita et al. | 359/73 |
| 5,243,455 | 9/1993 | Johnson et al. | 359/93 |
| 5,247,378 | 9/1993 | Miller | 359/86 |
| 5,257,123 | 10/1993 | Shingaki et al. | 359/86 |
| 5,347,378 | 9/1994 | Handschy et al. | 359/53 |
| 5,469,279 | 11/1995 | Sharp et al. | 349/171 |
| 5,528,393 | 6/1996 | Sharp et al. | 349/171 |

FOREIGN PATENT DOCUMENTS

WO90/09614  8/1990  WIPO.

OTHER PUBLICATIONS

McIntyre, C.M. and Harris, S.E., "*Achromatic Wave Plates for the Visible Spectrum,* " *J. Opt. Soc. of America* (Dec. 1968) 52(12):15751580.

Pancharatnam, S., "Achromatic Combinations of Birefringent Plates," *Indian Academy Sci. Proceed.* (1955), A41:130–136.

Pancharatnam, S., "Achromatic Combinations of Birefringent Plates," *Indian Academy Sci. Proceed.* (1955), A 41:137154.

Koester, C.J., "Achromatic Combinations of Half–Wave Plates," *J. Optical Soc. of America* (Apr. 1959) 49:405–409.

Title, A.M., "*Improvement of Birefringent Filters. 2:Achromatic Waveplates,*" *Applied Optics* (Jan. 1975) 14(1):229–237.

Wu, S.–T., "Birefringence dispersions of liquid crystals," *Physical Review A, American Physical Society* (1986) 33(2):1270–1274.

Displaytech, Inc. (Dec. 1995), "*Achromatic Rotator*", Boulder, CO, 2 pages.

Harlharan, P. and Ciddor, P.E. (1997), "*Achronmatic switchable polarization rotators,*" *Opt. Eng.* 36(3):952–956.

*Primary Examiner*—William L. Sikes
*Assistant Examiner*—James A. Dudek
*Attorney, Agent, or Firm*—Fleshner & Kim

[57] ABSTRACT

This invention provides a liquid crystal achromatic polarization rotator switch, and an achromatic shutter using the rotator switch. The rotator switch requires input light of a fixed orientation and switches between rotating the polarization by zero degrees and by a fixed angle, β. The achromatic shutter uses an achromatic 90-degree rotator switch positioned between a pair of polarizers. A first embodiment of the rotator switch comprises one planar-aligned rotatable smectic liquid crystal half-wave retarder in series with one passive half-wave retarder. The smectic liquid crystal cell has fixed retardance and is driven between two orientations for off- and on-states. A second embodiment of the rotator switch utilizes two variable birefringence liquid crystal cells. The variable birefringence cells having fixed orientation and variable retardance. In the off-state both retarders have zero retardance and in the on-state they have half-wave retardance.

57 Claims, 21 Drawing Sheets

SWITCHABLE ACHROMATIC POLARIZATION ROTATOR

FIELD OF THE INVENTION

The present invention relates to achromatic polarization rotator switches comprising two retarders in series, and to shutters and filters utilizing the rotator switch.

BACKGROUND OF THE INVENTION

Liquid crystal (LC) devices are presently utilized to produce numerous active structures, including color shutters, tunable polarization interference filters, light valves, and complex amplitude modulators. However, the chromaticity of liquid crystal retarders places limitations on the spectral band over which they function properly. Two factors contribute to the wavelength sensitivity, or chromaticity, of a waveplate: (1) dispersion, which is the wavelength dependence of the dielectric anisotropy, and (2) the explicit inverse wavelength dependence of retardation. Both components serve to increase the retardation at shorter wavelengths. A birefringent material with a particular retardation at the design wavelength will have greater retardation at shorter wavelengths and less retardation at longer wavelengths.

To examine the effect of retarder chromaticity, consider the polarization switches known in the art using rotative liquid crystal elements. In the conventional approach to shuttering light with a planar aligned chiral smectic liquid crystal (CSLC), the molecular director of an LC half-wave plate switches between 0 and $\pi/4$ orientations with respect to bounding crossed polarizers, as shown in FIG. 1. The half-wave retardance center wavelength is selected to provide maximum transmission at the operating wavelength. In display and cameras, it is selected to optimally span the visible spectrum. However, the on-state bandwidth is narrow, and invariably has poor red/blue transmission. Furthermore, small spatial thickness variations of the CSLC film produce highly visible color variations. FIG. 2 shows the computer model on-state transmission of a prior art CSLC shutter utilizing a 500 nm half-wave plate. The model includes the effect of birefringence dispersion. Note the extreme chromaticity of the shutter; the transmission varies by a factor of two over the visible spectrum.

More elaborate active achromatic structures are described incorporating multiple active elements. Dahl et al. (PCT Publication No. WO 90/09614 [1990]) describe an LC shutter which incorporates chromatic compensation. Here, two analog CSLC half-wave plates are positioned between a pair of crossed polarizers. The two plates are symmetrically modulated, the first with orientation Θ and the second with orientation 90-Θ, to provide a more achromatic response than a single cell shutter. Because this device requires two active CSLC cells it has not achieved wide use.

Chromaticity compensation using passive multilayers of identical retarder material was addressed by S. Pancharatnam, Proc. Indian Acad. Sci. A41, 137 [1955], by A.M. Title, Appl. opt. 14, 229 [1975], and by C. J. Koester, J. Opt. Soc. Am. 49, 405, [1959], all of which are herein incorporated by reference in their entirety.

Three-waveplate structures are described by Pancharatnam which function as achromatic retarders. These structures consist of three films of identical material, and design parameters are provided to allow construction of devices with arbitrary retardance values. It is noteworthy that a minimum of three elements are required in order to construct a Pancharatnam compound retarder.

By mechanically rotating a Pancharatnam achromatic half-wave retarder unit, wavelength insensitive reorientation of linear polarization is feasible. Electromechanical rotation of such compound half-wave retarders has been used extensively to tune polarization interference filters for astronomical imaging spectrometers. Of course, a solid-state version of this would require electrooptic rotation of three retarders synchronously.

A simplified solid-state achromatic retarder was recently invented by Sharp and Johnson (U.S. patent application Ser. No. 08/419,593). This Pancharatnam based design comprises a single rotative LC half-wave retarder bounded by passive half-wave retarders. The inventors realized that, for a few specific orientations, rotation of a single element is sufficient to effectively rotate the optic axis of the entire structure.

Half-wave retarders, including the Pancharatnam three-element half-wave retarder unit, convert an incident plane polarized beam of arbitrary orientation Θ with respect to the retarder axis to a beam of orientation -Θ. Koester realized that an "achromatic rotator" can be formed using two linear half-wave retarders. The achromatic rotator requires input polarization at a fixed orientation and provides rotation of the plane of polarization through a fixed angle. Unlike an achromatic retarder it cannot accept light polarized with arbitrary orientation. Therefore, mechanical or solid state rotation of the waveplates would destroy the function of the achromatic rotator, and active switching of the rotator has not been described.

SUMMARY OF THE INVENTION

This invention provides a liquid crystal achromatic polarization rotator switch, and an achromatic shutter using the rotator switch. The rotator switch requires input light of a fixed orientation and switches between rotating the polarization by zero degrees and by a fixed angle, β. The achromatic shutter uses an achromatic 90-degree rotator switch positioned between a pair of polarizers. An achromatic shutter according to this invention is designed and demonstrated which provides excellent on-state transmission over the entire visible, ≧97% from 415 nm to 700 nm after normalization for polarizer loss, and high contrast, 500:1 from 455 nm to 632 nm. This device was constructed using a commercially available LC mixture and low-cost stretched polymer retarder film.

A first embodiment of the rotator switch comprises one planar-aligned rotatable smectic liquid crystal half-wave retarder in series with one passive half-wave retarder. The smectic liquid crystal cell has fixed retardance and is driven between two orientations for off- and on-states. To achieve a zero-rotation off-state, the rotator switch exploits the fact that in general the state of polarization is unchanged by a pair of identical retardation films with crossed optic axes. Thus, for the off-state the active and passive retarders are crossed. For the on-state design equations are provided that determine the tilt angle requirements and orientations for optimum spectral coverage. Equations governing shutter contrast ratio are also provided that dictate the extent to which the zero-order retarders must be matched in characteristics. The smectic liquid crystal cells can utilize SmC* and SmA* liquid crystals, as well as distorted helix ferroelectric (DHF), antiferroelectric, and achiral CSLCs.

A second embodiment of the rotator switch utilizes two variable birefringence liquid crystal cells. The variable birefringence cells having fixed orientation and variable retardance. In the off-state both retarders have zero retardance and in the on-state they have half-wave retardance. The orientations of the two retarders are fixed, and follow the same design equations as the on-state orientations of the first embodiment. The variable birefringence liquid crystal cells used in this invention include homogeneously aligned nematic liquid crystals, nematic π-cells, and homeotropically aligned smectic liquid crystal cells.

The achromatic polarization rotator switch is useful for achromatizing the on-state of shutters, modulating the polarization in color shutters, inverting the spectra of polarization interference filters, compensating for color variations in CSLC shutters, and for generally increasing the throughput of polarization control systems.

BRIEF DESCRIPTION OF THE DRAWINGS

FIG. 3, comprising

FIG. 5, comprising

FIG. 9, comprising

DETAILED DESCRIPTION OF THE INVENTION

The elements in the devices of this invention are optically coupled in series. The orientation of a polarizer refers to the orientation of the transmitting axis, and the orientation of a birefringent element refers to the orientation of the principal optic axis of that element. Orientations are defined with respect to the axis of polarization of input plane-polarized light. In the illustrations of birefringent elements, the orientation is shown by arrow-headed lines and the retardance is labeled on the side of the element. When the retardance is switchable between two values, the values are both labeled on the side and are separated by a comma. The retardance refers to the retardance at a design wavelength, where the term design wavelength refers to the wavelength at which the retarders provide the specified retardance. At other wavelengths, there is a deviation, $\delta$, in retardance from the retardance at the design wavelength.

The term fixed retarder refers to a birefringent element wherein the orientation and retardance are not electronically modulated. Rotatable liquid crystal retarders of this invention have electronically rotatable orientation and fixed retardance at the design wavelength. Liquid crystal variable retarders or, equivalently, liquid crystal variable birefringence retarders, have electronically variable retardance (birefringence) and fixed orientation. The term achromatic refers to an optical device having no first order dependence of the transmitted electromagnetic field amplitude on $\delta$, and therefore no second order dependence of the transmitted power on $\delta$.

90-degree Rotator

Figure 3A:
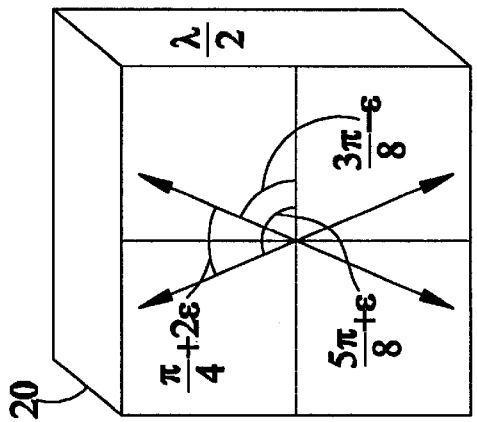
FIGS. 3a–c, is an achromatic rotator switch comprising a rotatable smectic liquid crystal half-wave plate (a) following and (b) preceding a single passive retarder, and (c) an achromatic rotator switch comprising two liquid crystal variable retarders.
Figure 3A:
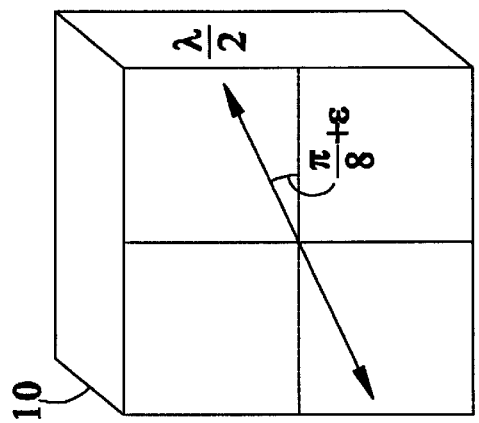
Figure 3A:
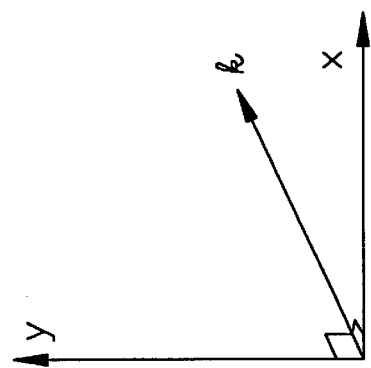
Figure 4:
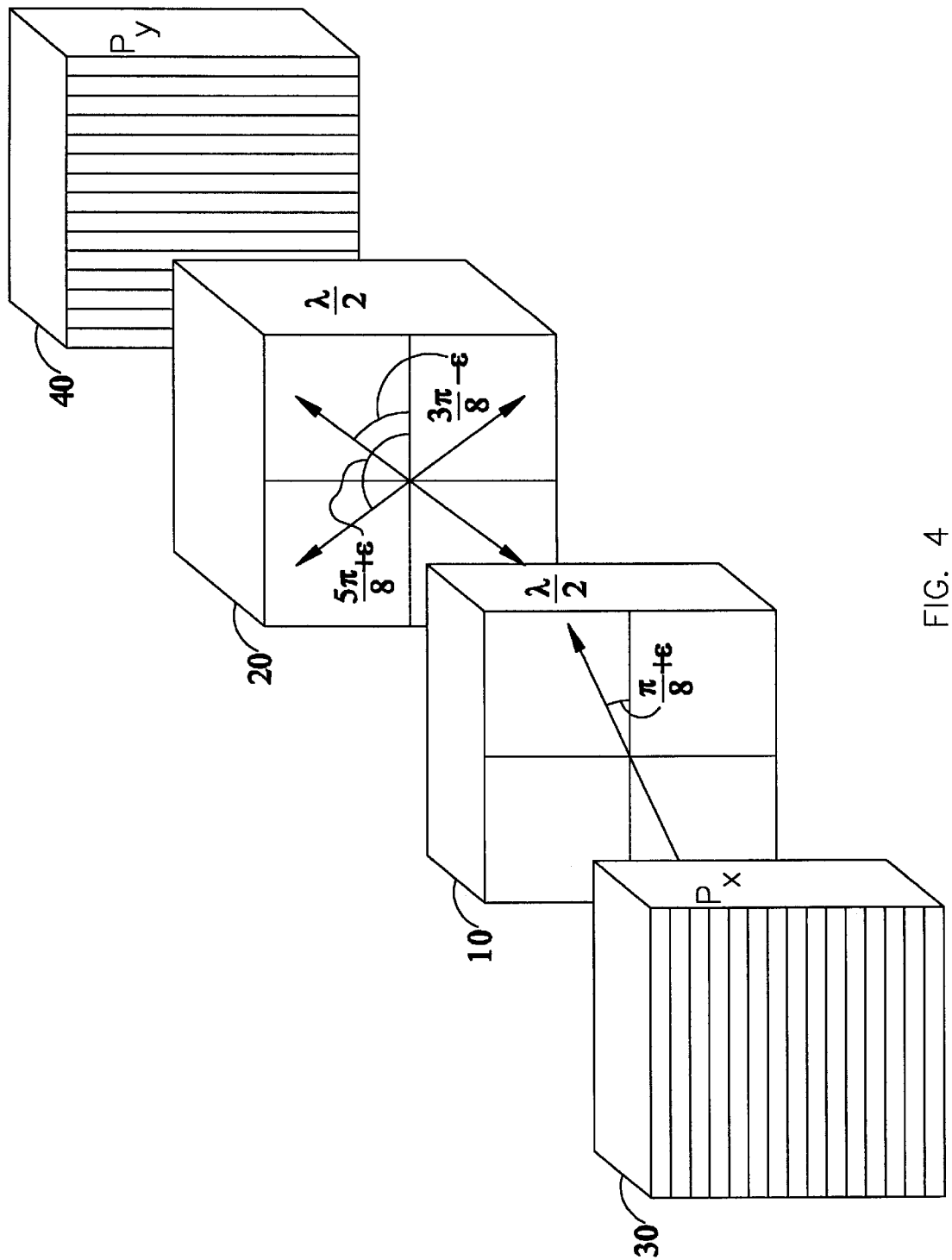
FIG. 4 is an achromatic shutter utilizing the 90-degree rotator switch.

FIG. 3a is a first embodiment of the polarization rotator switch of this invention. Since it is frequently desirable to switch broad-band light between orthogonal linear states, a 90-degree achromatic rotation is described in this embodiment. An achromatic shutter is formed by placing the rotator switch between a pair of polarizers (FIG. 4). Passive half-wave retarder 10 is oriented at π/8+$\epsilon$ with respect to input light polarized along the x-axis, where $\epsilon$ is a small angle. Rotatable liquid crystal half-wave retarder 20 is oriented at 3π/8-$\epsilon$ in the on-state and at 5π/8+$\epsilon$ in the off-state. In the on-state the switch provides an achromatic 90-degree polarization rotation, having exactly 90-degree rotation at two wavelengths, $\lambda_R$ and $\lambda_B$. The off-state corresponds to crossed optic axes and produces a zero net retardance and no polarization rotation.

The small angle, $\epsilon$, is selected to optimize the behavior over the wavelength band of operation. Increasing $\epsilon$ increases the separation between $\lambda_R$ and $\lambda_B$. The maximum preferred $\epsilon$ is that for which $\lambda_B$–$\lambda_R$ equals the operating band. Accordingly, the term small angle is used herein for any value of $\epsilon$ less than this maximum. The small angle is typically in the range $0 \leq \epsilon \leq 5°$. For a non-zero value of $\epsilon$, a 90-degree rotation occurs exactly for two wavelengths. As this angle is increased, the operating band is increased. However, the sacrifice is a loss in rotation efficiency at the design wavelength of the half-wave retarders. The half-wave design wavelength is selected based on the desired operating band. Due to the inverse wavelength dependence of retardation and birefringence dispersion, this is somewhat less than the center of the operating band.

The liquid crystal rotatable retarder can be an FLC, or it can be any material with an electronically rotatable optic axis, including planar aligned SmC* and SmA* liquid crystals, as well as distorted helix ferroelectric (DHF), antiferroelectric, and achiral CSLCs. The retarder switches between at least two orientations, $\alpha_2$ and $\alpha_{2'}$. It can, depending on the liquid crystal employed and the electric field applied, rotate continuously between a range of orientations including $\alpha_2$ and $\alpha_2'$, switch between bistable states $\alpha_2$ and $\alpha_2'$, or be switched between two or more discrete but not necessarily stable orientations. Although orientations between $\alpha_2$ and $\alpha_2'$ do not produce achromatic rotators, within a shutter they can be used for gray scale transmission. Liquid crystals having surface or volume stabilized orientations can be used to make passive matrix displays having memory.

In the embodiment of FIG. 3a, the liquid crystal optic axis must rotate by an angle of $\pi/4+2\epsilon$. Thus, the optimum tilt angle for the rotator is slightly greater than the $\pi/8$ tilt required for the exemplary prior art shutter. Since the achromatic bandwidth is quite sensitive to $\epsilon$, the CSLC tilt angle is a critical parameter for optimization. Since the tilt angle depends upon temperature, applied field and modulation rate, active compensation for operating conditions can be used to stabilize the liquid crystal retarder. Inaccuracy in the orientations of the liquid crystal and passive retarders must be less than $\epsilon$ and is preferably <0.50.

The passive retarder can be any birefringent material. Suitable materials include crystalline materials such as mica or quartz, stretched polymeric films such as mylar or polycarbonates, and polymer liquid crystal films. In a preferred embodiment, the dispersion of the passive retarders is approximately matched to the liquid crystal dispersion. Mylar, for example, has a similar dispersion to some CSLCs.

The active and passive retarders are preferably matched in design wavelength and dispersion. In the shutter having crossed polarizers, an ideal broad-band off state occurs when the half-wave retardation wavelengths are identical, their dispersions are matched, and they are fully crossed. In practice, off-state leakage is often due to residual retardance between the waveplates. While center wavelengths can be easily matched, residual retardance is typically attributed to differing birefringence dispersion of the two materials. For instance, retardation film used for display devices (Nitto NRF or NRZ) exhibits lower birefringence dispersion than typical CSLC mixtures (E-Merck ZLI-3654 or SCE-13). The difference retardation yields a small leakage at the extreme blue/red wavelengths of the shutter operating band.

Figure 3B:
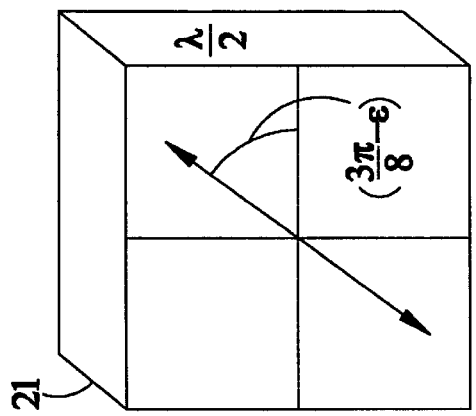
Figure 3B:
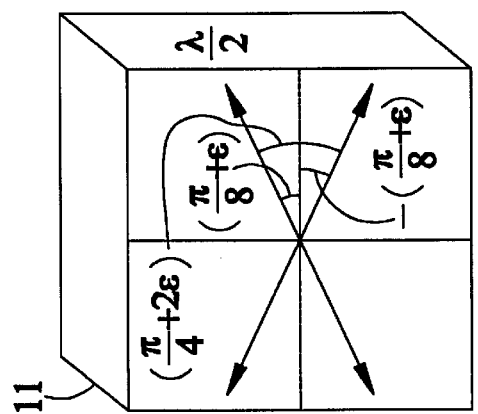
Figure 3B:
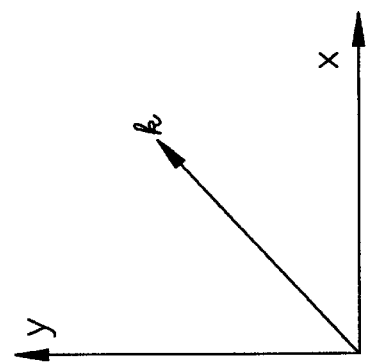

In the rotator switch described above the first retarder is passive and the second retarder is active. In a variation of this embodiment the second retarder is passive and the first retarder is active, as shown in FIG. 3b. Retarder 21 is fixed at $3\pi/8-\epsilon$, and retarder 11 switches between $\pi/8+\epsilon$ in the on-state and $-\pi/8-\epsilon$ in the off-state. As in the device of FIG. 3a, the rotation required is $\pi/4+2\epsilon$, and the two retarders are crossed in the off-state.

Figure 3C:
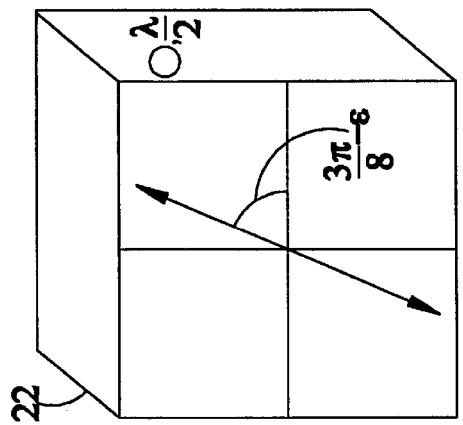
Figure 3C:
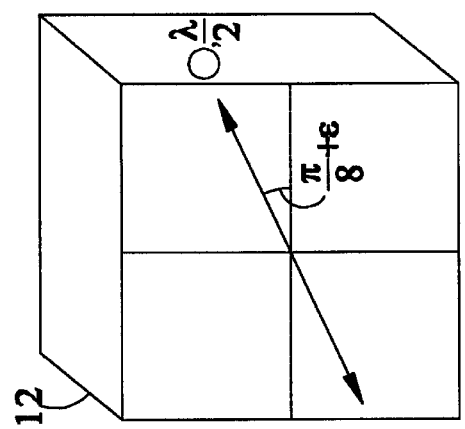
Figure 3C:
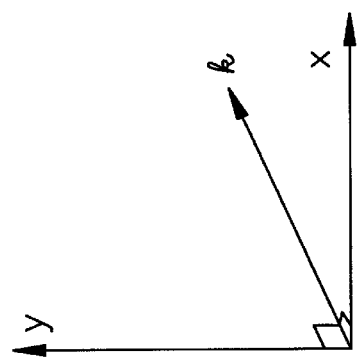

A second embodiment of the 90-degree polarization rotator switch is shown in FIG. 3c. It comprises two liquid crystal variable birefringence retarders having retardance simultaneously switchable between zero and half-wave. Retarder 12 is oriented at $\pi/8+\epsilon$ and retarder 22 is oriented at $3\pi/8-\epsilon$. The isotropic state (zero-rotation) is generated by electrooptically reducing the retardance of both elements to zero. Achromatic 90-degree rotation is provided when the retardances are half-wave. The variable birefringence liquid crystal cells which can be used in this invention include homogeneously aligned nematic liquid crystals, nematic $\pi$-cells, and homeotropically aligned smectic liquid crystal cells.

The embodiment of FIG. 3a,b is preferred over FIG. 3c for several reasons. The construction is simpler because it uses a single liquid crystal cell instead of two active cells. In addition, the switching speed of smectic liquid crystals is typically orders of magnitude faster than nematics. In the following description of design parameters, the embodiment of FIG. 3a,b is used as the representative device; the design parameters apply to both embodiments.

Achromatic Shutter

An achromatic shutter is produced when the 90-degree rotator is positioned between two polarizers, as shown in FIG. 4. Polarizer 30, positioned before the rotator switch, provides linearly polarized input light. In the illustrated embodiment, polarizer 40, positioned after the rotator switch, is perpendicular to the input polarizer. In the rotator switch on-state, achromatic 90-degree rotation of the x-polarized input light results in a shutter on-state having high transmission through the y-oriented output polarizer. In the rotator switch off-state, the rotator appears isotropic and produces no rotation. The x-polarized input light is therefore blocked by the analyzing polarizer, producing a shutter off-state.

In the case of parallel polarizers, the 90-degree rotating on-state of the rotator switch produces an off-state of the shutter, and vice versa. In general, if the dispersion of the two retarders is reasonably matched, the isotropic state of the rotator switch is more achromatic than the 90-degree rotating state. Therefore, depending on whether maximum transmission of the shutter on-state or maximum blocking of the shutter off-state is desired, the polarizers are selected to be parallel or crossed, respectively.

General Rotator

The achromatic polarization rotator of this invention can be designed to provide any angle of rotation, $\beta$. In the on-state of the general rotator, there are two half-wave retarders oriented at $$\alpha_1=\beta/4+\epsilon \tag{1}$$

$$\alpha_2=3\beta/4-\epsilon.$$

In the first embodiment, one of the two retarders is rotatable and the other is passive. In the off-state the rotatable retarder is switched so that the two retarders are crossed. If the first retarder is active it is switched to $\alpha_1'=\alpha_2+\pi/2$, and if the second retarder is active it is switched to $\alpha_2'=\alpha_1+\pi/2$. In the second embodiment, both retarders are variable retarders having half-wave retardance in the on-state and zero retardance in the off-state.

Figure 5A:
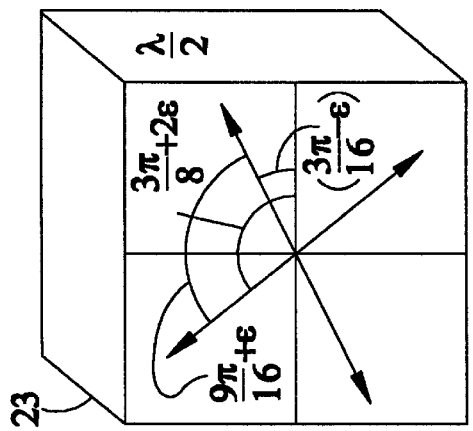
FIGS. 5a–b, is a 45-degree rotator switch having (a) n=0 and (b) n=1.
Figure 5A:
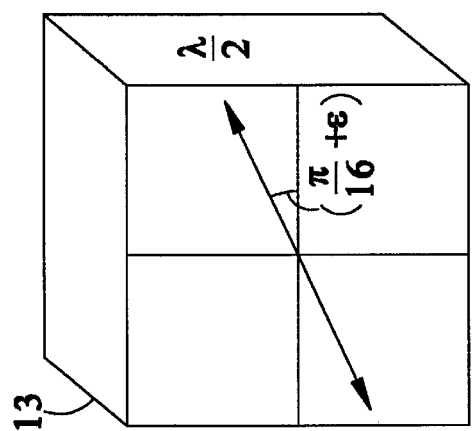
Figure 5A:
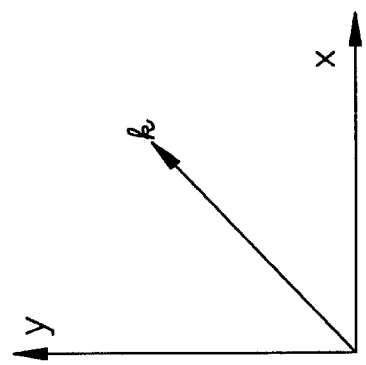

In a number of applications 45° ($\pi/4$) rotation is desired. According to Equation 1, in the on-state retarders 13 and 23 are oriented at $\alpha_1=\pi/16+\epsilon$ and $\alpha_2=3\pi/16-\epsilon$, as shown in FIG. 5a. In the off-state either the first retarder is switched to $\alpha_1'=-5\pi/16-\epsilon$ or the second retarder is switched to $\alpha_2'=9\pi/16+\epsilon$, either of which requires a $3\pi/8+2\epsilon$ (about 70°) rotation of the optic axis. Smectic liquid crystal cells are more typically rotatable by less than about 50°. An aspect of this invention is the recognition that the difference $\alpha_1$ and $\alpha_2$ can be increased by multiples of $\pi/2$ ($\pi/4$ change each) without changing the function of the rotator. For odd multiples of $\pi/2$ the sign of $\epsilon$ changes. Thus the equations defining the more general rotator are $$\alpha_1=\beta/4+(-1)^n\epsilon-n\pi/4$$

$$\alpha_2=3\beta/4-(-1)^n\epsilon+n\pi/4$$

where n is a non-negative integer. In the off-state, depending on which is the active retarder, either $\alpha_2' = \alpha_1 + \pi/2$ or $\alpha_1' = \alpha_2 + \pi/2$.

Figure 5B:
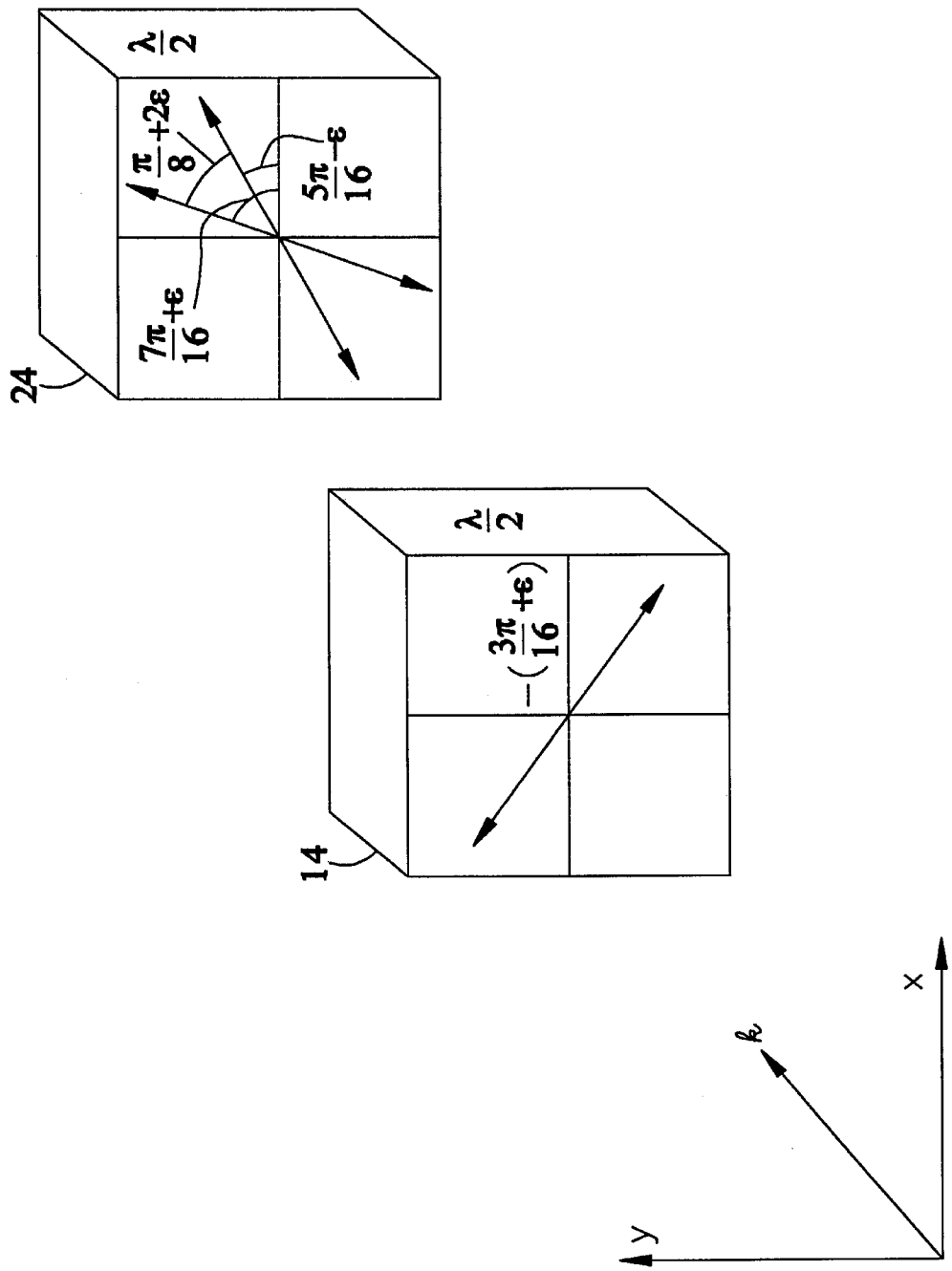

For the case of $\beta=45°$, when n=1, retarders 14 and 24 are oriented at $\alpha_1=-3\pi/16-\epsilon$ and $\alpha_2=7\pi/16+\epsilon$ in the on-state, as shown in FIG. 5b. In the off-state either the first retarder is switched to $\alpha_1'=-\pi/16+\epsilon$ or the second retarder is switched to $\alpha_2'=5\pi/16-\epsilon$, either of which requires a $\pi/8+2\epsilon$ rotation of the optic axis. The same orientation of the optic axes in the off-state can alternatively be achieved by a $7\pi/8-2\epsilon$ rotation in the opposite direction. The selection of n and the rotation direction can be based on the tilt angle of the available liquid crystal materials.

Design Optimization

In the following analysis, a Jones matrix is developed that propagates the optical field through the two-waveplate 90-degree rotator switch. The specific on-state and off-state configurations are then evaluated based on the general equations. After the design equations are developed, the specific example of a shutter based on CSLC and polymer materials is analyzed. Other rotation angles can be analyzed following this method.

In general, the Jones matrix propagating the complex Cartesian field amplitudes through the two-waveplate structure is given by $$W^1 = W(\Gamma_2, \alpha_2) W(\Gamma_1, \alpha_1),$$

where, $W(\gamma,\theta)$ represents the general Jones matrix for a linear retarder with retardation $\gamma$, and orientation, $\Theta$ $$W(\gamma, \theta) = \begin{pmatrix} \cos\gamma/2 - i\cos2\theta\sin\gamma/2 & -i\sin2\theta\sin\gamma/2 \\ -i\sin2\theta\sin\gamma/2 & \cos\gamma/2 + i\cos2\theta\sin\gamma/2 \end{pmatrix}.$$

In the on-state, incident plane-polarized broad-band light is ideally rotated to the orthogonal linear state. The analysis of the on-state is simplified by assuming that the two retarders are of identical material with a common center wavelength. Under this condition, the retardation can be written as $$\Gamma_1 = \Gamma_2 = \pi + \delta,$$

where $\delta$ is the wavelength dependent departure from the ideal half-wave retardance.

Two design parameters are of importance when constructing a rotator: the difference angle between the retarder orientations, $(\alpha_{2-\alpha 1})$, which largely determines the rotation angle, and the orientation of the bisector, $(\alpha_2+\alpha_1)/2$, which has a profound effect on the chromaticity of the structure.

For reasons that are clear by examination of the Poincare sphere transformations, a symmetric arrangement is chosen with the bisector oriented at $\pi/4$ or $$\alpha_1=\alpha, \quad \alpha_2=\pi/2-\alpha.$$

Multiplying the two Jones matrices gives the on-state matrix as $$W = \begin{pmatrix} a & |b|e^{i\phi} \\ -|b|e^{-i\phi} & a \end{pmatrix}, \quad (2)$$

where $a = \sin^2(\delta/2) + \cos(4\alpha)\cos^2(\delta/2),$ $b = \sin(4\alpha)\cos^2(\delta/2) + i\sin\delta\sin(2\alpha),$ and $\phi = \tan^{-1}[\sec(2\alpha)\tan(\delta/2)].$ At the design wavelength, the Jones matrix is a pure rotator, where the polarization rotation is twice the angle between the optic axes. This can be verified by substituting $\delta=0$ into the above matrix.

For a 90-degree polarization rotation, $\alpha=(\pi/8+\epsilon)$, giving $\alpha_1=\pi/8+\epsilon, \quad \alpha_2=3\pi/8-\epsilon,$ where $\epsilon$ is a small angle to be determined. This angle determines the extent to which the circular arcs, describing the transformations by each waveplate on the Poincare sphere, overlap. At the two wavelengths that the arcs intersect, it will be shown mathematically that the rotator can be made to function as a perfect 90-degree rotator.

Figure 1:
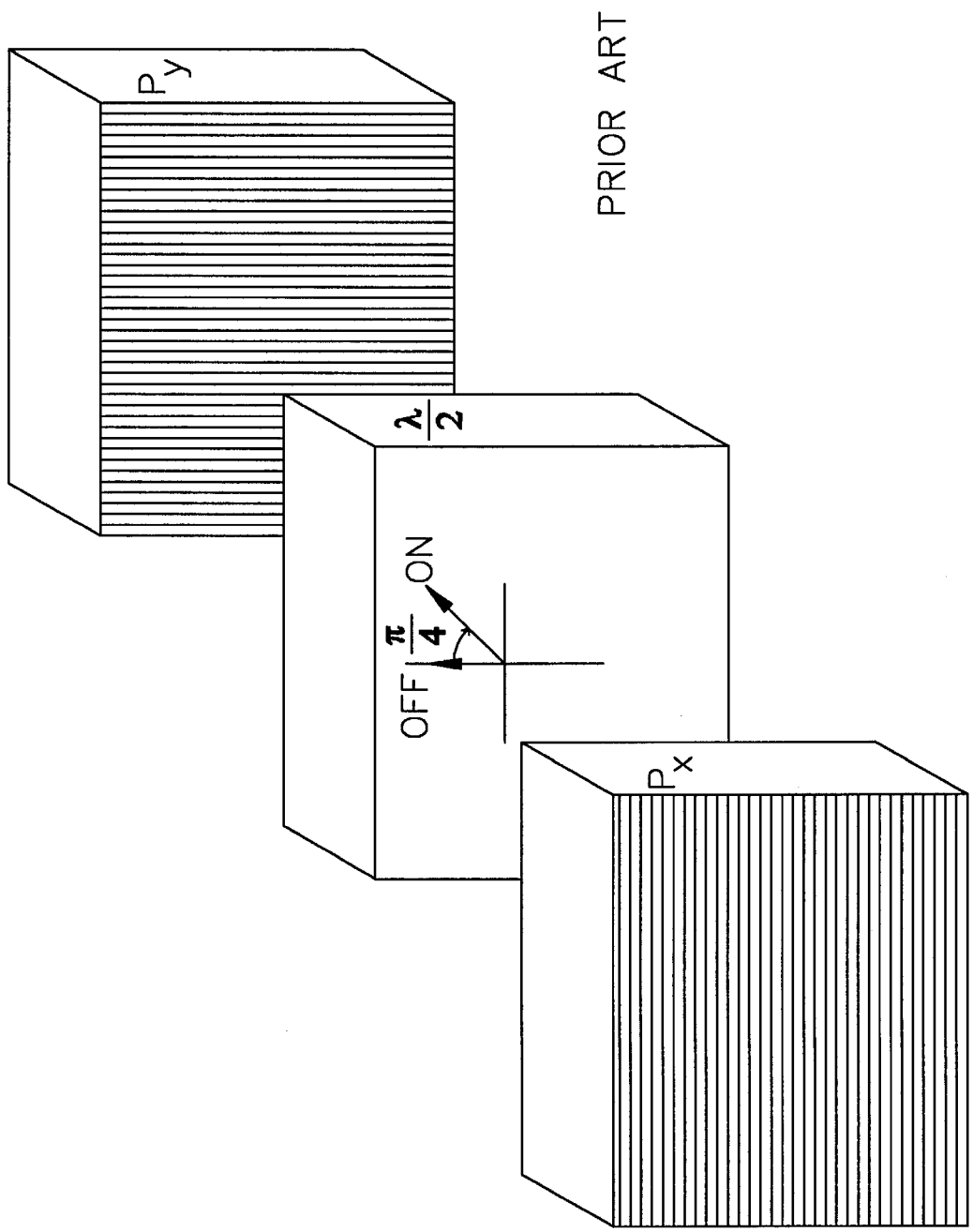
FIG. 1 is a light shutter comprising a CSLC cell between crossed polarizers.
Figure 6:
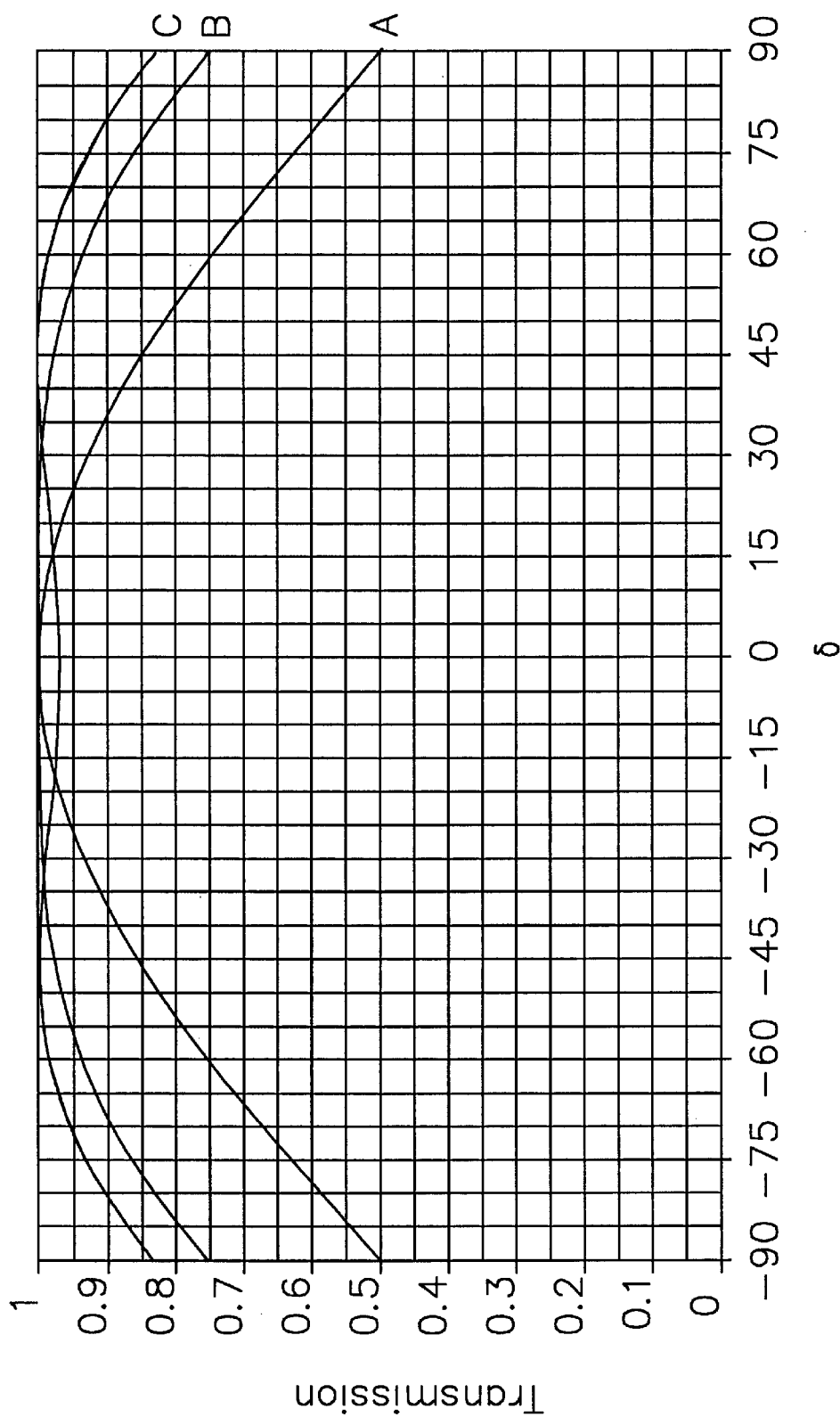
FIG. 6 is the on-state transmission versus departure from half-wave retardance ($\delta$) for (A) a simple CSLC shutter, and achromatic rotator shutters with (B) $\epsilon$=0 and, (C) $\epsilon$=2.5°.

Transmission functions of simple and achromatic shutter on-states are compared in FIG. 6. Prior art CSLC shutters (FIG. 1) provide an on-state transmission which is second order in the deviation from the half-wave retardance $$T_{ON}(\delta) = 1 - \sin^2(\delta/2) \quad (3)$$

The transmission function of Equation 3 is graphed in FIG. 6A. Very high contrast can be achieved using this scheme, though on-state transmission is quite chromatic. The latter prohibits high-contrast neutral off states in a parallel polarizer configuration. Furthermore, small thickness variations of the LC film over the aperture manifest themselves as highly visible birefringence color variations.

This behavior can be compared directly to that of the achromatic rotator structure using the Jones matrix of Equation 2. The transmission intensity of a crossed-polarizer shutter is given by the off-diagonal component, $T(\delta,\epsilon)=|b|^2$. This assumes x-polarized input light of unity amplitude, and an ideal y-oriented polarizer (unity transmission along the y-axis and infinite contrast). The transmission function simplifies to the general equation $$T_{ON}(\delta,\epsilon) = 1 - [\sin^2(\delta/2) - \cos^2(\delta/2)\sin(4\epsilon)]^2. \quad (4)$$

While Koester considers rotators with $\epsilon=0$ to be non-achromatic, it should be noted that considerable improvement is achieved with this arrangement over the conventional single-retarder scheme. Taking $\epsilon=0$ in Equation 4 gives the intensity transmission between crossed polarizers as $$T(\delta,0) = 1 - \sin^4(\delta/2).$$

The transmission function for $\epsilon=0$ is plotted in FIG. 6B. This rotator is similar to a single $\pi/4$-oriented retarder, in that it only fully transmits the orthogonal linear state at a single wavelength. However, considerable chromatic compensation is achieved by the symmetric arrangement of the rotator that is not available with a single retarder. That is, elliptical polarization induced at a particular wavelength by one retarder is largely compensated by the second, though the reorientation of the polarization is doubled. This serves to broaden the operating band over single retarders, as evidenced by the fourth-order dependence on $\delta$.

Still broader operating bands are achieved by selecting a non-zero value for $\epsilon$, which increases the tilt-angle requirements. By examination of the general transmission expression of Equation 4, unity transmission is achieved for the condition $$\sin(4\epsilon) = \tan^2(\delta/2).$$

corresponding to two wavelengths of 90-degree polarization rotation. Substituting this relationship into the Jones matrix of Equation 2 reveals that, apart from a linear retardance of $2\phi$, the matrix is that of a 90-degree rotator. In the case of an achromatic shutter, where x-oriented light is input and y-oriented light is transmitted, the transmission is in principle 100% at the two wavelengths. For more general inputs, the state of polarization is modified by the retardation $2\phi$.

The sacrifice in performance for a broadened achromatic bandwidth is a transmission dip at the design wavelength of the retarders. This is because an increase in the value of $\epsilon$ represents a diminished rotation efficiency at the design wavelength. Substituting the design wavelength into the transmission function gives the transmission loss at the design wavelength as $$T_{ON}(0,\epsilon)=\cos^2(4\epsilon).$$

Based on the dispersion of the retarder materials in the band of interest, and the choice of half-wave center wavelength, the selection of $\epsilon$ thus represents a compromise between operating bandwidth, and maintenance of rotation efficiency at the design wavelength.

The transmission function for $\epsilon=2.5°$ is plotted in FIG. 6C. The plot shows the clear separation of the unity transmission wavelengths and the transmission loss at the design wavelength.

To optimize the choice of small angle $\epsilon$, consider an example of a rotator switch based on dispersive material. In the small angle approximation, the achromatic condition is approximately $\epsilon=(\delta/4)^2$. This can be substituted into Wu's model (Phys. Rev. A 33, 1270 [1986]) for birefringence dispersion, giving the correction angle as a function of the achromatic wavelength(s), $\lambda_{R,B}$ $$\epsilon = \left[ \frac{\pi}{4} \frac{(\lambda_{R,B}\lambda_0 + \lambda^{*2})(\lambda_0 - \lambda_{R,B})}{\lambda_0(\lambda_{R,B}^2 - \lambda^{*2})} \right]^2, \quad (5)$$

where $\lambda^*$ is the mean UV resonance of the material and $\lambda_0$ is the half-wave design wavelength. Smectic C* materials, such as ZLI-3654 (E-Merck), have tilt angles of 25-degrees at room temperature, allowing a value of $\epsilon=2.5°$. Using Equation 5, this gives ideal efficiency at $\lambda_B=435$ nm, and $\lambda_R=615$ nm, with a spectral separation of 179 nm. The maximum preferred value of $\epsilon$ is that angle which gives $\lambda_B$ and $\lambda_R$ at the edges of the desired operating range of the rotator. Preferably the two transmission maxima fall further inside the operating range so that transmission throughout the range is maximized. Typically $0 \leq \epsilon \leq 5°$.

In selecting the appropriate materials, account must be taken of the dispersion of the CSLC material and the degree with which the two materials are dispersion matched for optimum off-state performance. The off-state of the device is produced when the two half-wave retarders are crossed, giving $$\alpha_1=\pi/8+\epsilon, \quad \alpha_2=5\pi/8+\epsilon,$$

as shown in FIG. 3a. Neglecting other sources of loss, and assuming crossed retarders with identical half-wave center wavelength, the Jones matrix of the off-state is easily described as a linear retarder with orientation $\alpha=(5\pi/8+\epsilon)$, and retardation $\Delta=(\delta_2-\delta_1)$. Provided that the dispersion of the retarders is matched, the off-state is ideal. In practice, contrast is diminished by spatial variations in LC thickness and lack of dispersion matching between active and passive films.

When the rotator is composed of materials with dissimilar birefringence dispersion, or if the center wavelengths are not identical, residual retardance degrades the contrast. Consider a shutter device composed of a CSLC film and a passive film of dissimilar characteristics, but identical half-wave center wavelength. Using Wu's model for birefringence, where each material has a specific resonance wavelength, the retardance is given by $$\Delta = \pi \frac{\lambda}{\lambda_0} \left[ \frac{(\lambda^2 - \lambda_0^2)(\lambda_2^{*2} - \lambda_1^{*2})}{(\lambda^2 - \lambda_1^{*2})(\lambda^2 - \lambda_2^{*2})} \right],$$

where, $\lambda_1^*$ and, $\lambda_2^*$ are the mean UV resonance wavelengths for the two materials. Based on the orientation given for the off-state of the shutter, the Jones matrix gives the intensity transmission of the structure between crossed polarizers $$T_{OFF}=\frac{1}{2}[1+\sin(4\epsilon)]\sin^2(\Delta/2).$$

This equation gives the criteria for dispersion matching between the two retarders.

EXAMPLE 1

Consider the design of a visible-band shutter using the achromatic rotator switch between crossed-polarizers, and having the following performance specifications and material characteristics:

Liquid Crystal: $\lambda^*=243$ nm

Passive retarder: Nitto NRF polycarbonate with $\lambda^*=186$ nm

Design Wavelength: $\lambda_0=500$ nm

Spectral Coverage: >97% transmission for 430–680 nm

Contrast Ratio: 100:1 minimum.

Figure 7:
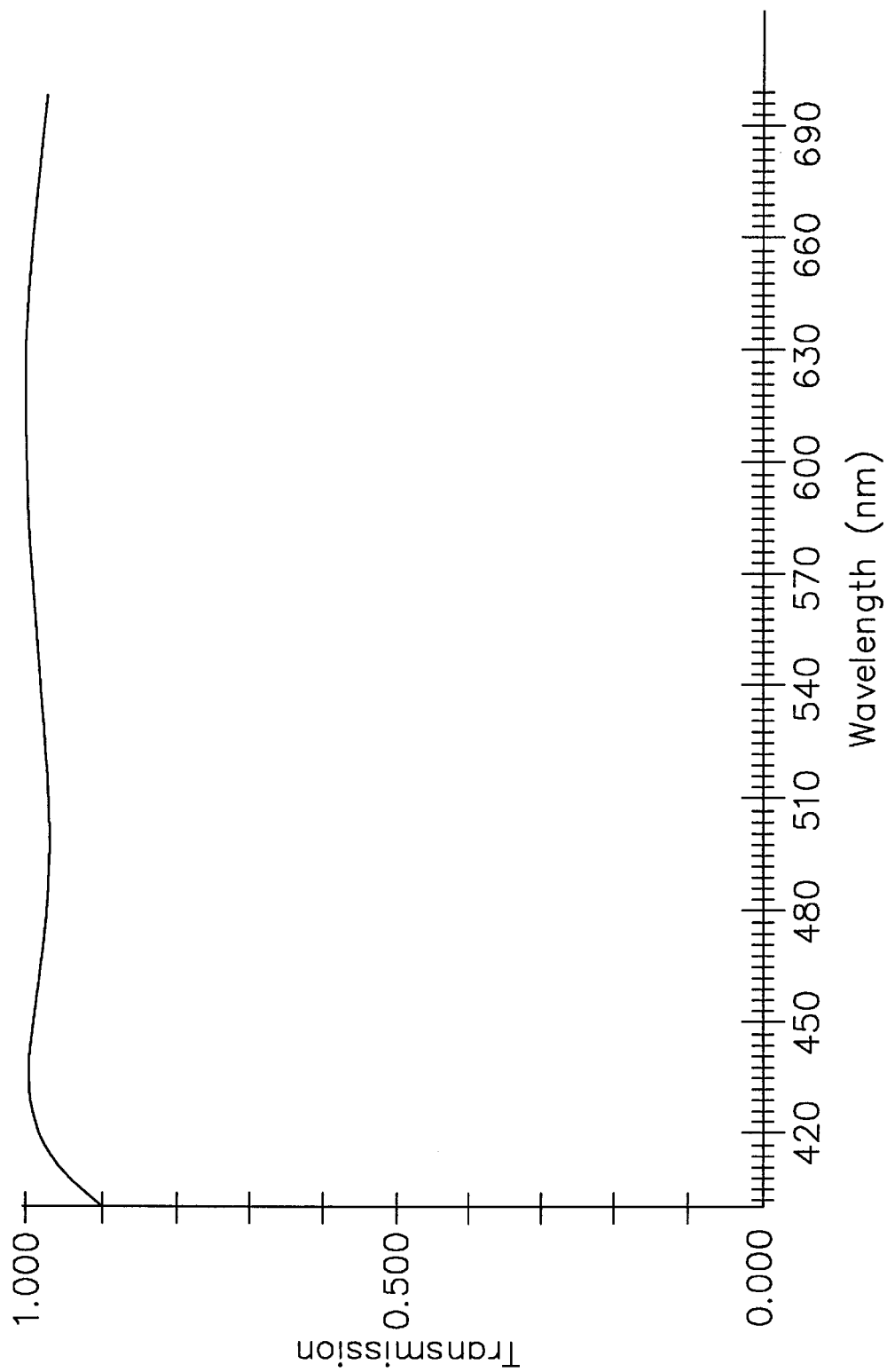
FIG. 7 is the calculated on-state transmission spectrum of a crossed polarizer shutter using a visible band achromatic rotator switch. The structure is based on dispersion of 500 nm half-wave LC and polycarbonate retarders.

Using the previous analysis, a CSLC which modulates orientation between 65° (on) and 115° (off) is appropriate. The passive retarder film is oriented at 25° with respect to the input polarizer. The computer model on-state and off-states generated from the above values are shown in FIGS. 7 and 8, respectively.

Using this choice of $\epsilon$ (2.5°), the transmission dip is 3% at the design wavelength. The achromatic bandwidth is taken to be defined by the extreme blue/red wavelengths corresponding to a 3% loss in transmission. From FIG. 7, this occurs at 415 nm and >700 nm, respectively, which corresponds to an achromatic bandwidth exceeding 285 nm. For comparison sake, the prior art CSLC shutter centered at 500 nm has a 97% bandwidth of 70 nm (469 nm to 539 nm). This gives a more than four-fold enhancement in achromatic bandwidth over a simple CSLC shutter.

Figure 8:
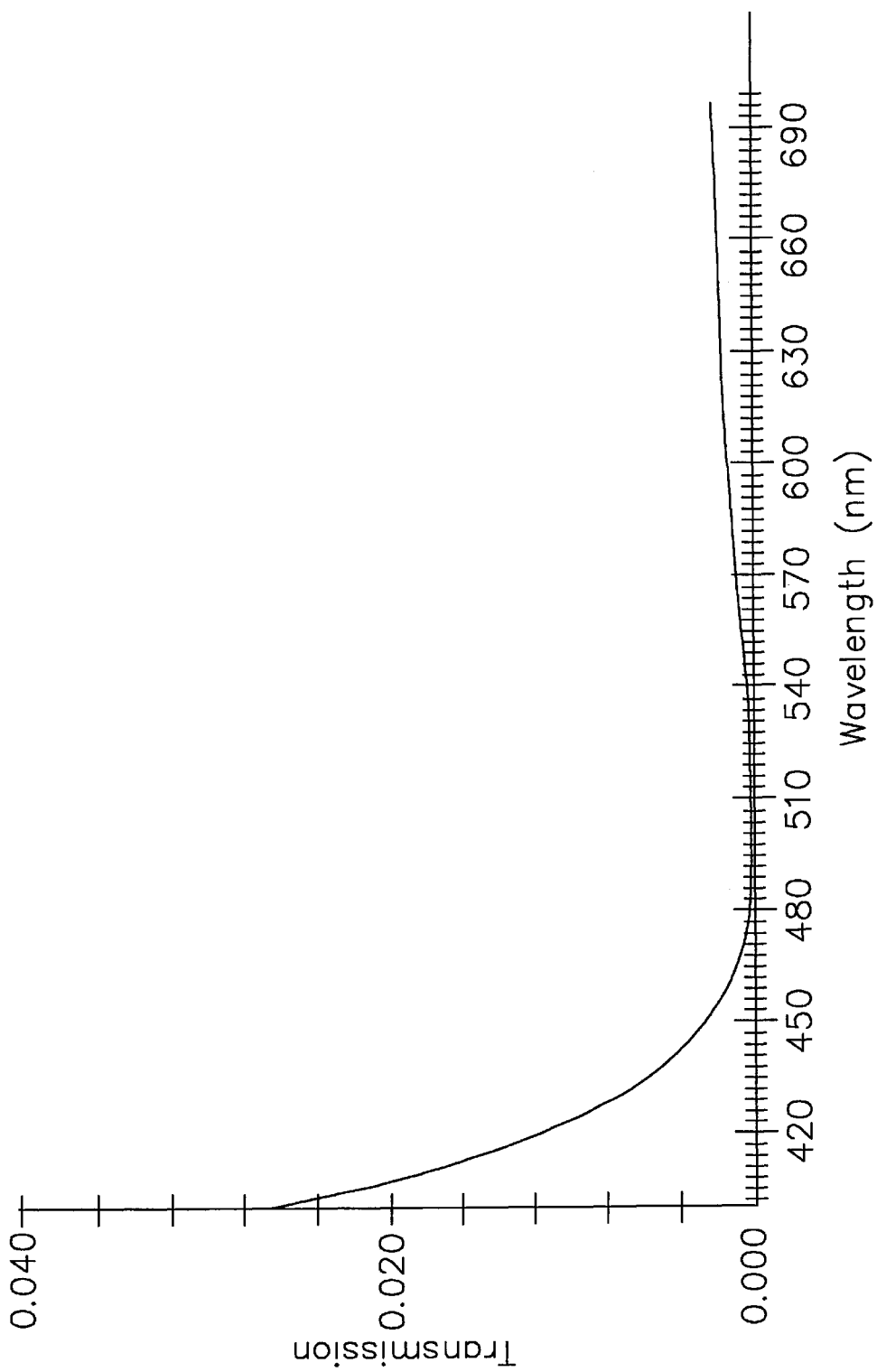
FIG. 8 is the calculated off-state transmission spectrum of the shutter of FIG. 7.

The calculated off-state transmission is shown in FIG. 8. This result shows that the contrast remains above 500:1 over 177 nm (455 nm to 632 nm), and above 200:1 over more than 262 nm (438 nm to >700 nm). For wavelengths longer than the design wavelength, the contrast degrades very slowly. However, a rapid degradation in contrast occurs at the extreme blue wavelengths due to explicit increased sensitivity on wavelength as well as dispersion. For instance, the contrast drops from 200:1 to 36:1 in a matter of 38 nm (438 nm to 400 nm). This can be somewhat compensated by reducing the design wavelength if necessary.

An achromatic shutter was experimentally demonstrated to verify the performance predicted by computer modeling. The CSLC device was fabricated using ZLI-3654 material from E-Merck. The ITO (indium tin oxide) coated 44-mil thick substrates were spin coated with nylon 6/6 and were rubbed unidirectionally after annealing. Glass spacers with a diameter of 1.9 microns were dispersed uniformly over the surface of one substrate and UV cure adhesive was printed on the inner surface of the other substrate. The substrates were gapped by applying a uniform pressure and subsequently UV cured. The CSLC material was filled in vacuum under capillary action in the isotropic phase and slowly cooled into the C* phase. After cooling, leads were attached to the ITO and the device was edge-sealed. The CSLC cell had a half-wave retardance at approximately 500 nm.

The structures were probed by illuminating with quasi-collimated light from an Oriel quartz halogen lamp, and the transmitted light was analyzed using an Ando spectrum analyzer system. Parallel Glan-Thompson polarizers were used to provide broad-band plane polarized input light and to analyze the output. The source was initially analyzed and stored by the instrument with the polarizers inserted. A switch was subsequently inserted between the polarizers and mechanically rotated during 1 Hz.

Figure 2:
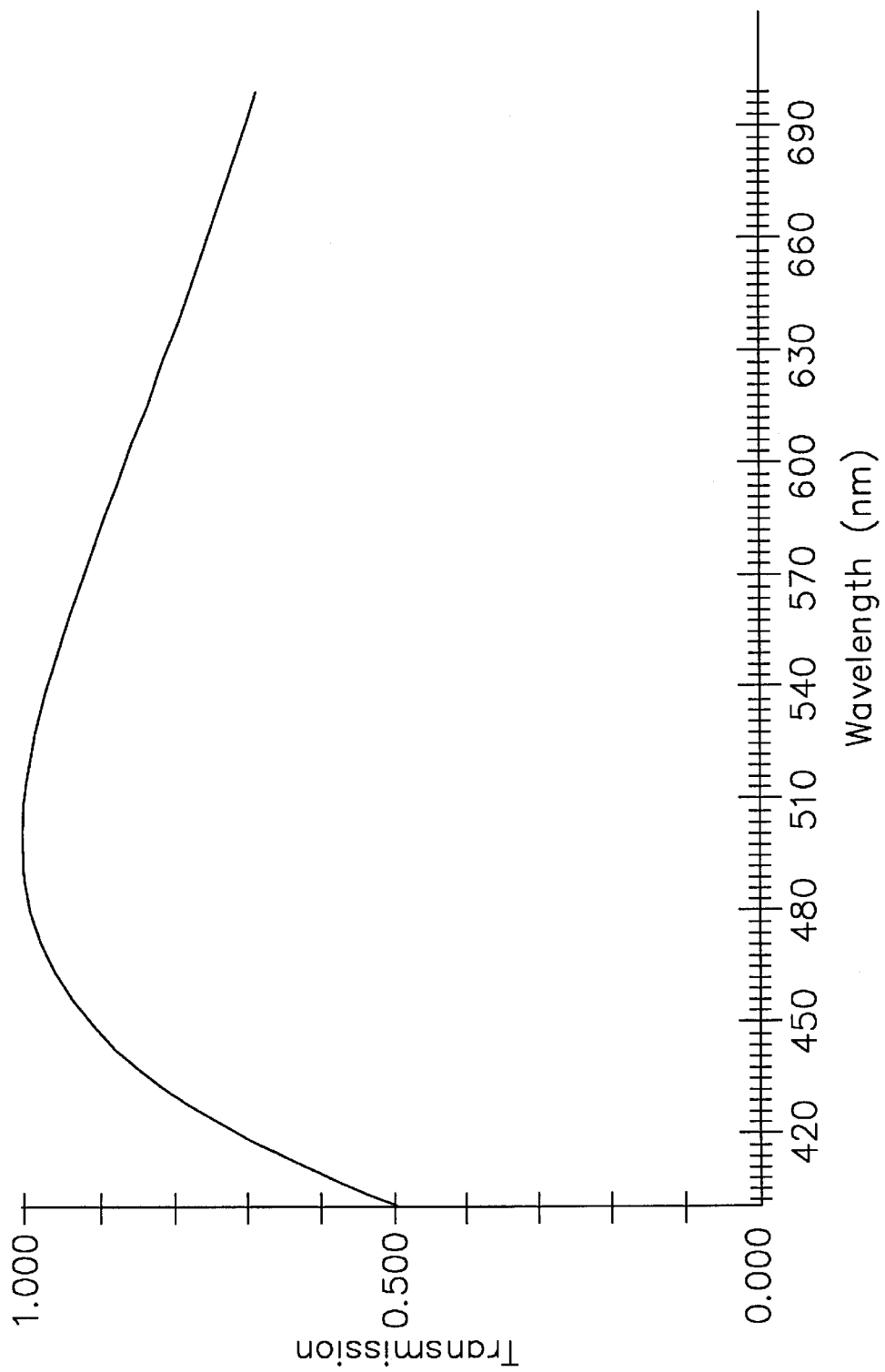
FIG. 2 is computer model output for the on-state of the shutter of FIG. 1.
Figure 9A:
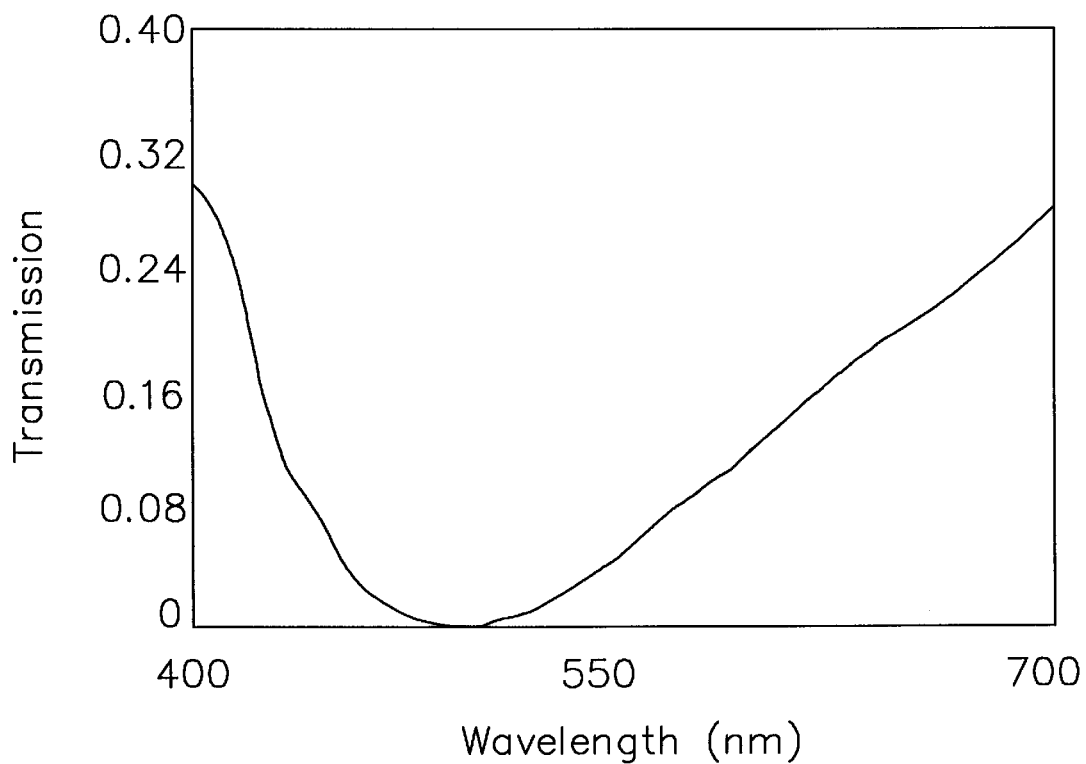
FIGS. 9a–b, is the measured shutter off-state transmission spectra for (a) a single CSLC retarder oriented at π/4 between parallel polarizers, and (b) the achromatic rotator switch between parallel polarizers.

Prior to assembling into an achromatic rotator, the liquid crystal device was used to verify the theoretical result of FIG. 2. The device was switched between on- and off-states between parallel polarizers. The devices are driven by a 5 volt 1 Hz square wave while the spectrum is scanned to avoid DC drift in the orientation of the molecular director. Since the polarizers were parallel, the spectra are inverted with respect to FIG. 2 and it is the off-state which is chromatic, as shown in FIG. 9a. Since the device is a half-wave retarder at a single wavelength, a high-contrast null was observed at 500 nm, with significant leakage at other visible wavelengths.

Subsequently, the CSLC device was assembled into an achromatic rotator. The device was placed in a light box consisting of crossed polarizers with a fluorescent backlight. With a 5 volt amplitude signal, the device was square-wave modulated at 20 Hz and rotated until zero flicker was observed. This corresponds to symmetric switching of the molecular director with respect to the polarizer. The device was then fixed in this orientation and the modulation rate reduced to under 1 Hz. A film of Nitto adhesive backed NRF polycarbonate retarder (half-wave at 500 nm) was then placed above the device and the output observed as it was rotated. When the retarders were in the crossed configuration, a high contrast neutral null was observed. The alternate polarity produced a neutral on-state. By changing the analyzer to a parallel polarizer configuration, the neutrality and contrast of the alternate state was observed. Ideally, the 90-degree rotation state yields a high contrast null between parallel polarizers. When both states were satisfactory, the CSLC substrate was cleaned with IPA and the retarder deposited. This was done by mechanically rolling the film on from one edge to avoid trapping air bubbles. After this step, the device was analyzed using the diagnostic setup described above.

Figure 9B:
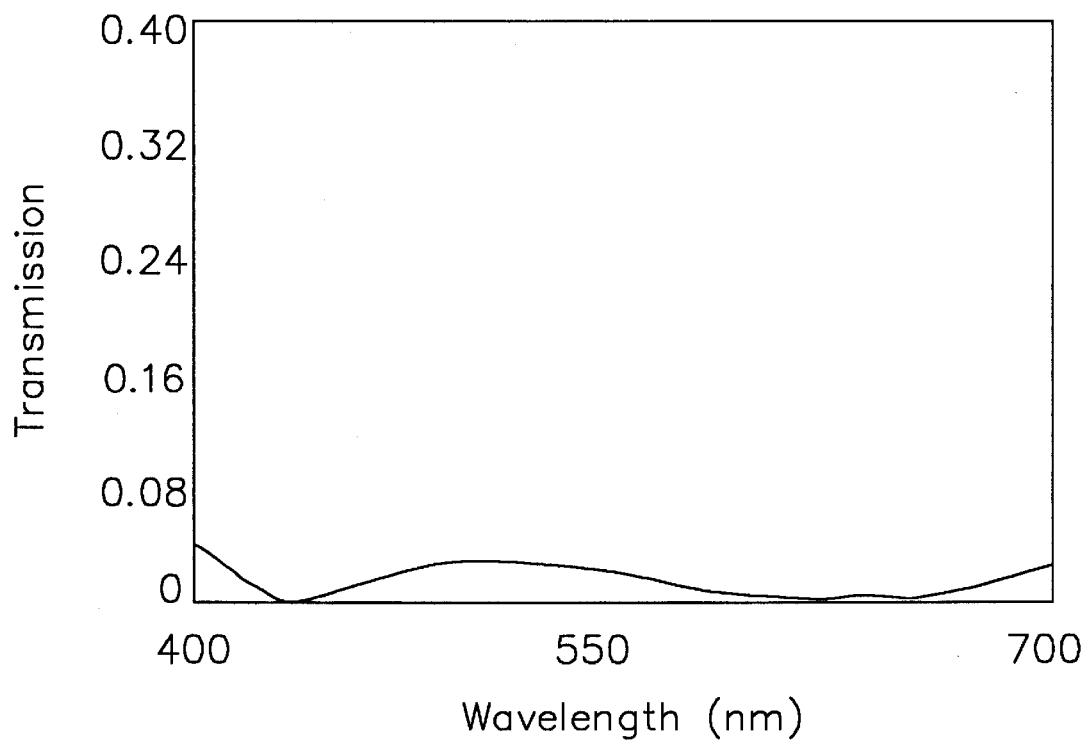
Figure 10:
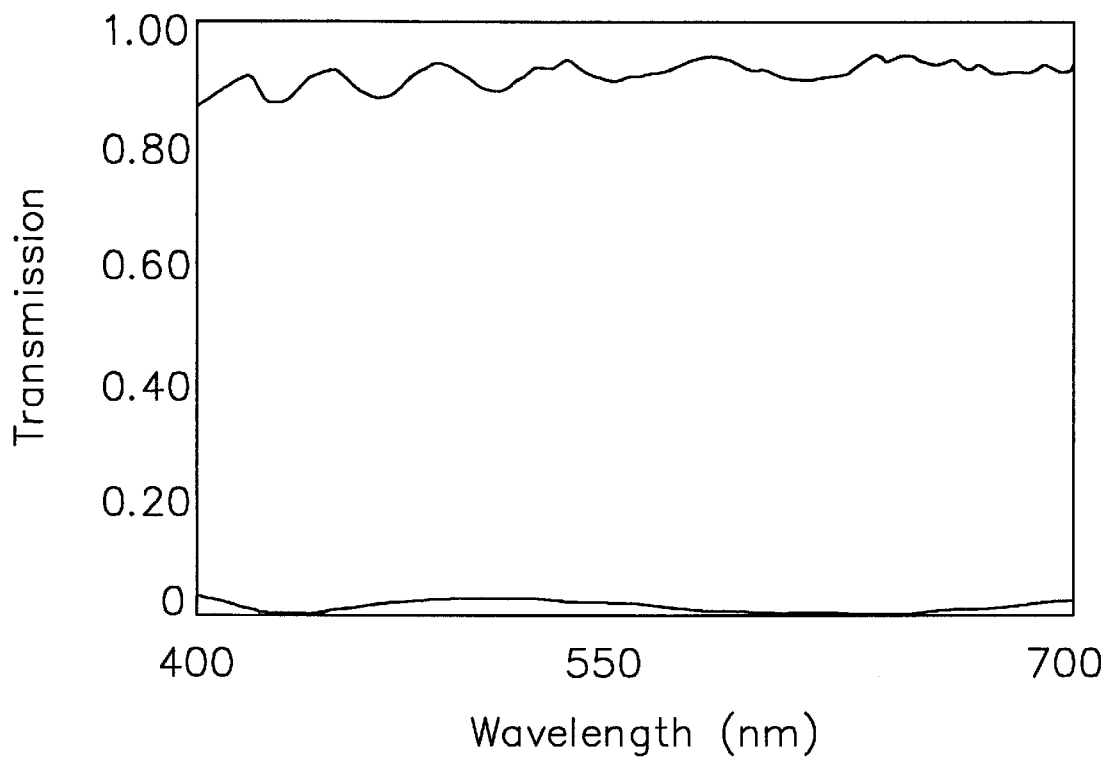
FIG. 10 shows measured on- and off-state spectra of the shutter of FIG. 9b. This shows that a high-transmission is obtained in the isotropic state, while a neutral off-state is obtained in the π/2 rotation state.

The parallel-polarizer transmission of the achromatic rotator is shown in FIGS. 9b and 10. With parallel polarizers the device was analyzed using the diagnostic setup described above.

The parallel-polarizer transmission of the achromatic rotator is shown in FIGS. 9b and 10. With parallel polarizers the off-state of the shutter is achieved when the rotator switch is a 90° rotator, and the on-state corresponds to the crossed-retarder isotropic configuration. The off-state is in excellent agreement with the (inverted) model results of FIG. 7. FIG. 9b clearly shows the two null wavelengths predicted by the design analysis, and the leakage at the design wavelength. The two nulls produce much improved performance over the single retarder modulator of FIG. 9a.

The leakage at the design wavelength and at the operating band edges is 3%, which optimizes performance over the entire visible spectrum. For a narrower operating band a smaller $\epsilon$ can be used, which provides better performance. Typically, $\epsilon \leq 3°$, and for very narrow operating bands, $\epsilon = 0$. FIG. 10 shows both the on- and off-states of the device between parallel polarizers. High transmission of the on-state is expected, since the retarders are in the crossed position. The modulation of transmission and increased loss in the blue, shown in the on-state, are due to the Fabry-Perot enhancement of the ITO film absorption.

EXAMPLE 2

Figure 11:
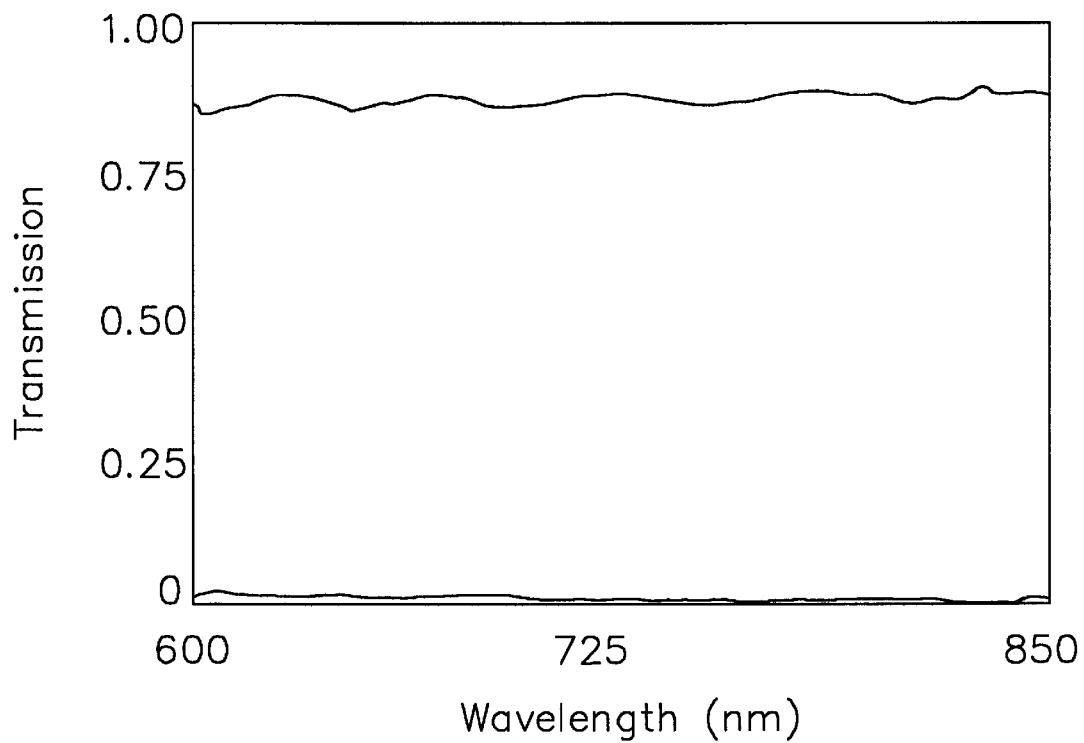
FIG. 11 shows the measured on- and off-state output of an achromatic shutter between parallel polarizers. The device was fabricated using a 720 nm half-wave CSLC (E-Merck ZLI-3654) retarder and Nitto 400 nm polycarbonate retarder.
Figure 12:
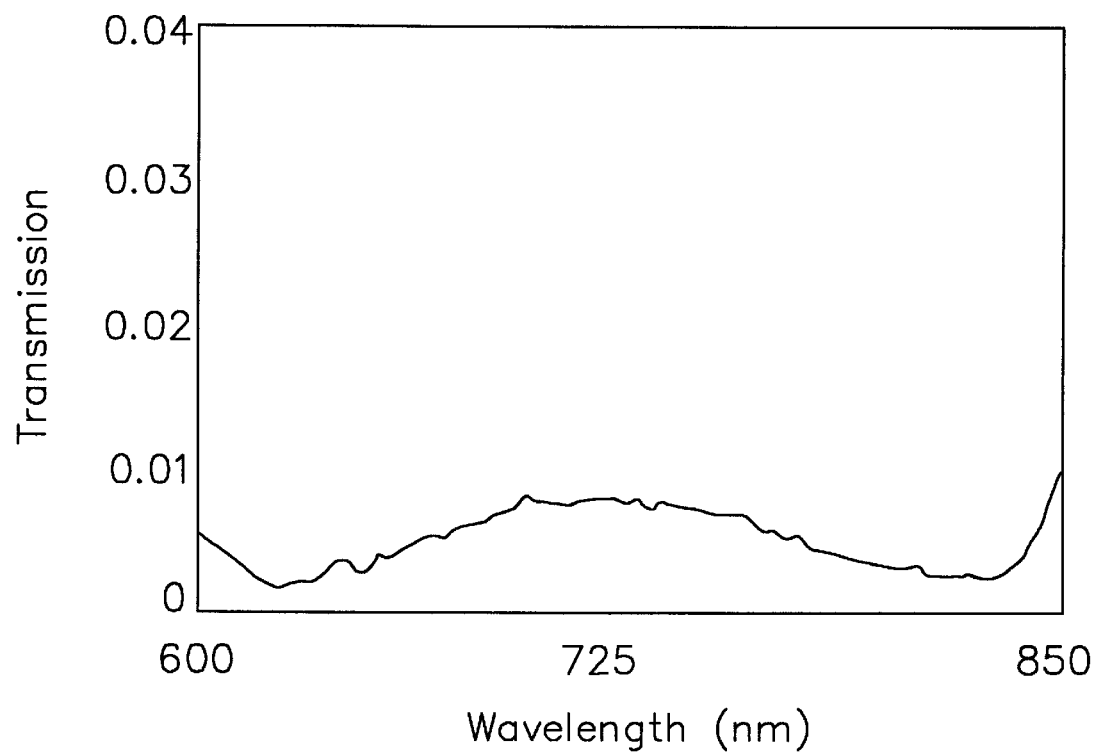
FIG. 12 is a high-resolution plot of the transmission of the shutter of FIG. 11. The parallel polarizer leakage remains below 1.0% for a 250 nm band spanning 600 nm to 850 nm.

Using the achromatic shutter at longer center wavelengths, where CSLC dispersion is greatly reduced, enormous operating bands are feasible. For instance, the calculated 97% transmission bandwidth of a shutter centered at 600 nm is approximately 400 nm (480 nm–880 nm), while that for a simple CSLC shutter is only 150 nm (540 nm–690 nm). A long wavelength achromatic rotator, having a design wavelength of 730 nm, was constructed in the fashion described in Example 1. FIGS. 11 and 12 show the measured transmission of the achromatic rotator between parallel polarizers. The shutter was optimized to provide high parallel polarizer efficiency for the 600 nm to 850 nm band. Less than 1% leakage is shown in FIG. 12 throughout this band.

Device Applications

The achromatic shutter of this invention can be utilized in applications such as CCD cameras, eye protection systems, glasses in virtual reality system, three-color shutters in field-sequential display, beamsteerers, diffractive optics and for increasing the brightness of LC flat-panel displays.

Figure 13:
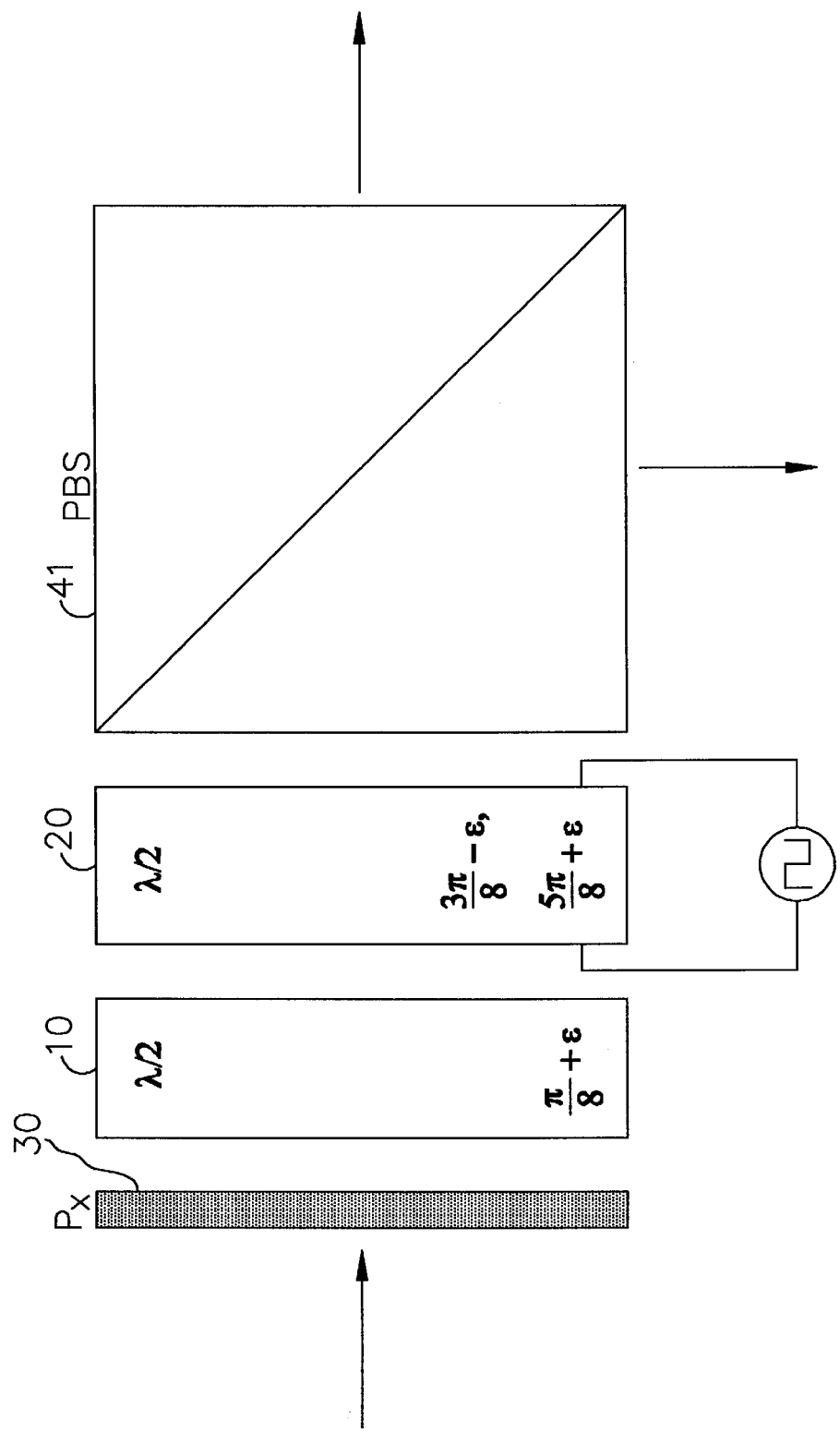
FIG. 13 shows a broad-band switching device which uses a polarization splitter to direct light. Switching the polarity on the LC device switches the port in which the broad-band light exits.

The achromatic rotator can also be used in combination with polarization splitters for switches and polarization independent switches. By following the rotator switch with polarization splitter 41, as shown in FIG. 13, broad-band light exits either of two ports by selecting the polarity of applied field. In this drawing optical elements are shown in cross section and are represented by rectangular boxes. The retardance of birefringent elements is listed in the top of the box and the orientation is in the bottom. When elements can rotate between two or more orientations, both orientations are listed in the box and are separated by a comma. Because of the neutrality of the rotator, the parallel polarizer output provides a dark (bright) state when the crossed polarizer output yields a bright (dark) state. In addition, patterned polarizers can be used to modulate between on- and off-states of adjacent pixels using a device without patterned electrodes.

Figure 14:
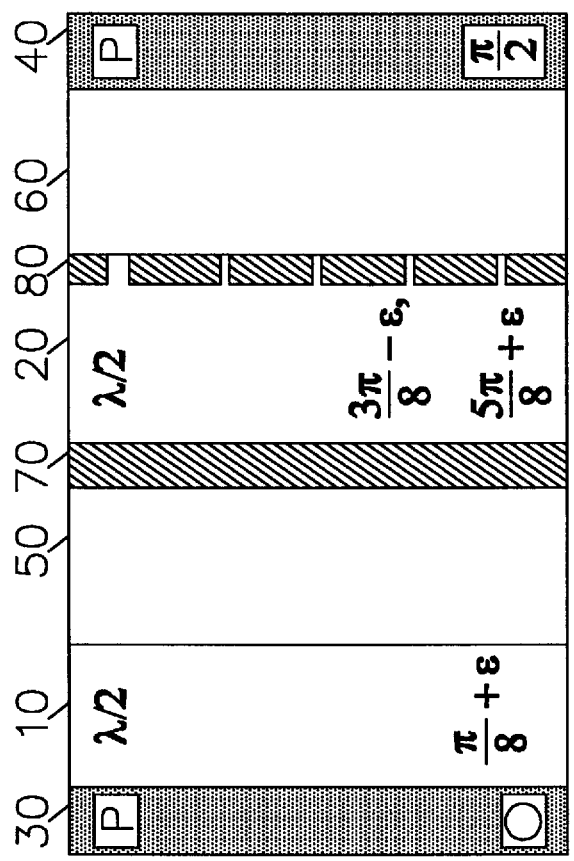
FIG. 14 is a display using the rotator switch to produce more light efficient and neutral shutter arrays. Owing to the neutrality of the switch, the polarizers can be either parallel or crossed.

For many display applications the achromatic shutter can be used in a multiple-pixel array, as shown in transmission-mode in FIG. 14. In this illustration the CSLC cell is formed between substrates 50 and 60. Voltages are applied using transparent electrode 70 and pixellated transparent electrode 80. The pixellated electrode can individually activate the pixels. In this embodiment polarizers 30 and 40 are crossed. The array is illuminated by a backlight assembly, which can be collimated by a lens. The display is viewed in transmission.

Numerous devices known in the art can be improved by using the achromatic rotator of this invention. The criteria for replacing a single retarder with the achromatic rotator switch of this invention is that the single retarder must be a half-wave plate or otherwise function as a polarization rotator (for example a twisted nematic cell), and it must be positioned in the device in a location where the input polarization is linear and of a known orientation.

The achromatic rotator switch is particularly suited to applications where digital switching of broad-band light is required between known input and output polarization orientations. It is therefore especially suited for use in devices wherein it is positioned adjacent to a linear polarizer. While the function is the same as an achromatic variable retarder in a shutter application, a rotator cannot necessarily be used interchangeably with a variable retarder. For instance, the rotator switch may not function properly as an achromatic switch between passive retardation plates, where input polarization states are arbitrary.

The achromaticity of the rotator switch is particularly advantageous in color filtering devices because it can increase the throughput across the entire visible spectrum as well as the color contrast (which determines saturation). In the polarization interference filters of U.S. Pat. No. 5,132,826, 5,243,455 and 5,231,521, all of which are herein incorporated by reference in their entirely, a smectic liquid crystal rotatable retarder and a passive birefringent element, preferably oriented at 45°, are positioned between a pair of polarizers. In the split-element polarization interference filters of U.S. Pat. No. 5,528,393, issued on Jun. 18, 1996, which is herein incorporated by reference in its entirety, a center retarder oriented at 0° or 90° and a pair of split-element retarders oriented at ±45° are positioned between a pair of polarizers. Liquid crystal rotatable retarders are added to the split-element or center retarders. The individual liquid crystal rotatable retarders of the above-mentioned polarization interference filters can be replaced with the achromatic rotator switch of the present invention.

Figure 15:
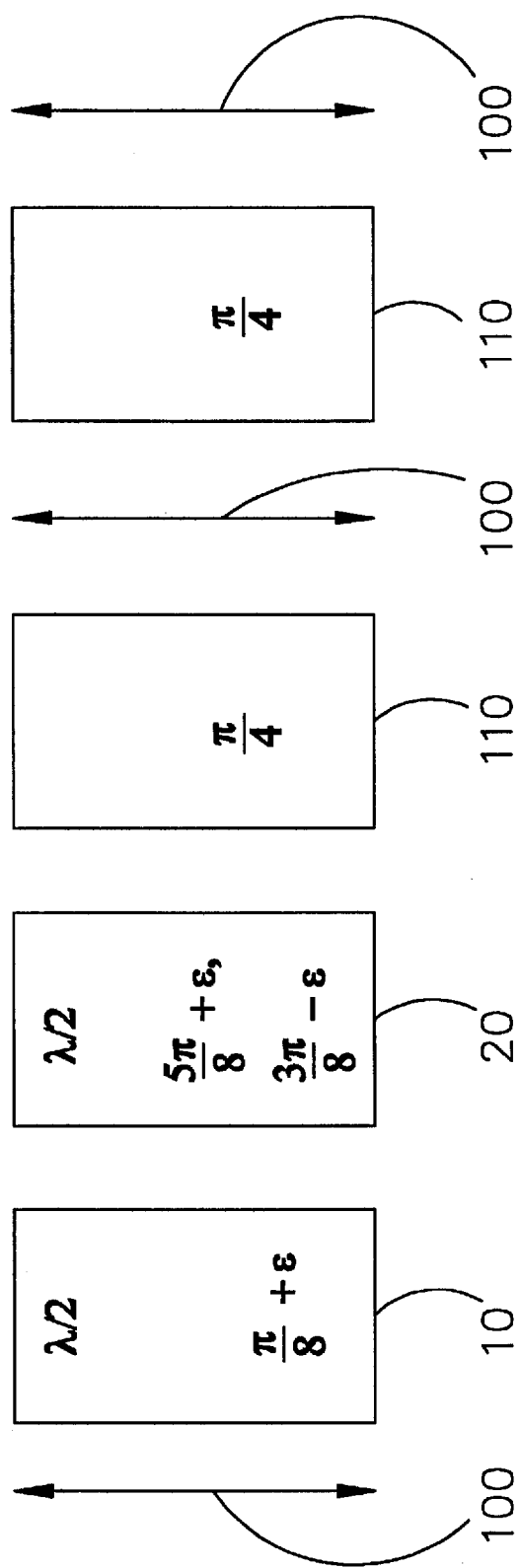
FIG. 15 shows a polarization interference filter that utilizes the achromatic polarization rotator of the present invention.

FIG. 15 shows a polarization interference filter utilizing the achromatic polarization rotator of the present invention. The polarization interference filter comprises linear polarizers 100, passive half-wave retarder 10, liquid crystal rotatable half-wave retarder 20, and passive retarders 110.

Figure 16:
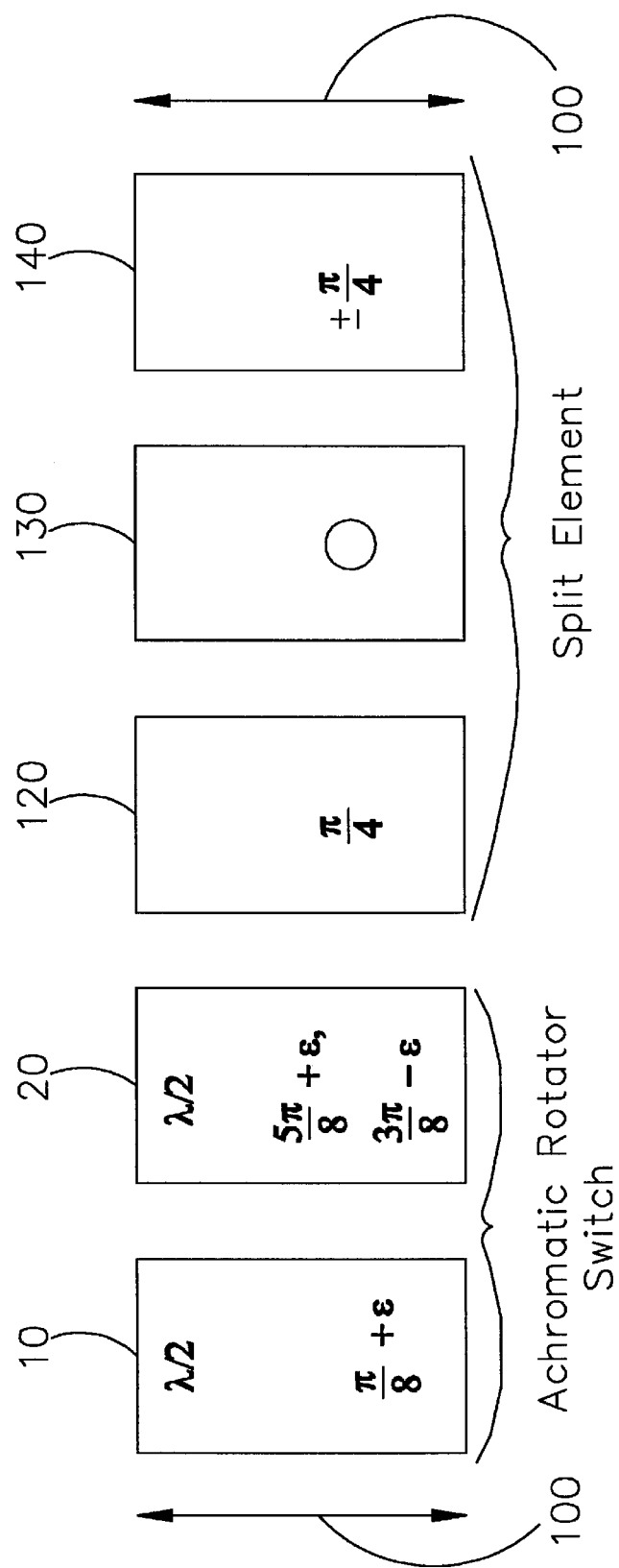
FIG. 16 shows a split-element filter utilizing the achromatic polarization rotator of the present invention.

FIG. 16 shows a split-element filter utilizing the achromatic polarization rotator of the present invention. The split-element filter comprises linear polarizers 100, a passive half-wave retarder 10, a liquid crystal rotatable half-wave retarder 20, and split-element retarders 120, 130 and 140.

The liquid crystal handedness switch and color filters described in U.S. Pat. No. 5,619,355, issued on Apr. 8, 1997, which is herein incorporated by reference in its entirety, can also be improved by using the achromatic rotator of the present invention. A circular polarization handedness switch comprises a linear polarizer, a liquid crystal half-wave retarder rotatable between 0° and 45°, and a quarter-wave plate at 45°. The color filters use the handedness switch in combination with one or more color polarizers, such as cholesteric circular polarizers. The simple liquid crystal rotatable retarders described in the handedness switch invention can be replaced with the achromatic rotator switch of the present invention.

The achromatic rotator switch can further be used to improve color shutters based on linear polarization switches. A linear polarization switch comprises a first linear polarizer and a half-wave retarder rotatable between 0° and 45°. To make a color shutter, the linear polarization switch is followed by a second linear polarizer. Either the first, the second, or both linear polarizers are linear color polarizers. The linear color polarizer can be a pleochroic linear polarizer, as described in U.S. Pat. No. 5,619,355, or a polarizer retarder stack (PRS) color polarizer. A pleochroic polarizer film typically transmits a color on one polarization axis and white light on the other. Two films can be crossed and laminated to provide a color polarized which transmits a different color on each axis. A PRS comprises a linear polarizer and two or more retarders, wherein the number of retarders in the stack and the retardances and orientations of the retarders are such that an additive primary color spectrum is transmitted along a first polarization axis and the complementary subtractive primary color spectrum is transmitted along a second, orthogonal, polarization axis. PRS technology is described in U.S. patent application Ser. No 08/447522, filed May 23, 1995, which is herein incorporated by reference in its entirety. The rotator switch can be used as a replacement for the simple CSLC polarization switches as well as for the achromatic half-wave switches described therein.

Figure 17:
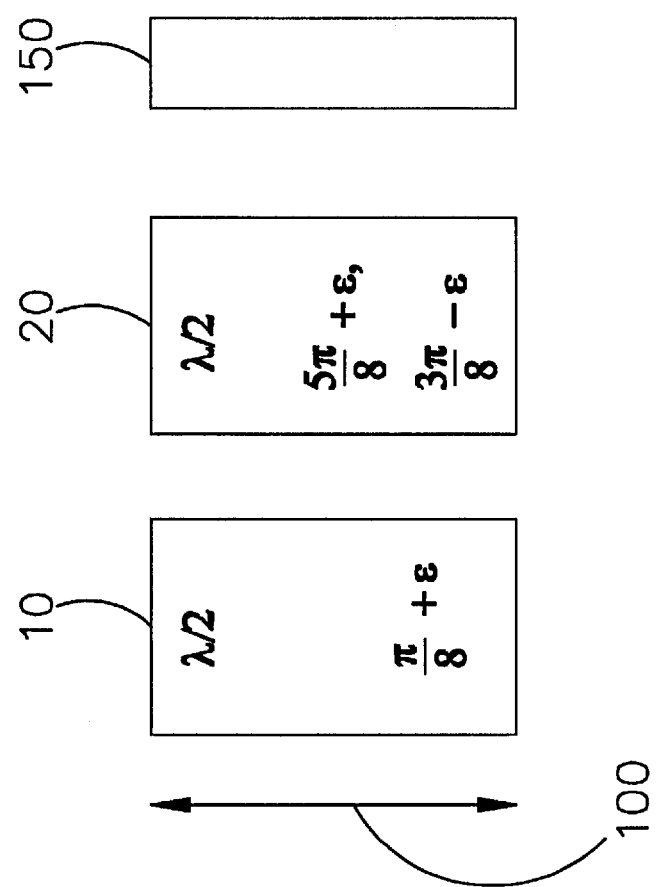
FIG. 17 a is a color filter utilizing the achromatic polarization rotator of the present invention.

FIG. 17 shows a color filter utilizing the achromatic polarization rotator of the present invention. The color filter comprises a linear polarizer 100, a passive half-wave retarder 10, a liquid crystal rotatable half-wave retarder 20 and color polarizer 150. As discussed above, the color polarizer 150 may be a pleochroic linear polarizer or a PRS color polarizer, and preferably transmits a different color along each axis.

The achromatic rotator switch can also be used to improve other color filters known in the art, for example as described in Handschy et al., U.S. Pat. No. 5,347,378 and Sasaki, U.S. Pat. No. 5,089,905, which are herein incorporated by reference in their entirety. These color filters comprise a linear polarizer and a rotatable liquid crystal retarder. In some embodiments they further comprise pleochroic polarizers and in other embodiments they further comprise a second linear polarizer and a passive birefringent element. The simple liquid crystal rotatable retarder described in these references can be replaced with the achromatic rotator switch of the present invention.

Color filters using the rotator switch of this invention can be temporally multiplexed, wherein the output color is switched on a timescale which is rapid compared to a slow response time detector, such as the human eye. The color filters can also contain more than one stage, where a stage begins with a linear polarizer.

A multitude of further applications of the achromatic rotator switch and achromatic shutter of this invention will be readily apparent to those skilled in the art, and fall within the scope of this invention.

What is claimed is:

1. An achromatic polarization rotator switch for receiving linearly polarized light oriented at 0° and rotating the received light by an angle $\beta$, comprising:

a first half-wave retarder oriented at $\alpha_1 = \beta/4 + -1)^n \epsilon - n\pi 4$ with respect to said linearly polarized light, wherein n is a non-negative integer and wherein $\epsilon$ is a small angle; and a second half-wave retarder, in series with said first retarder, oriented at $\alpha_2 = 3\beta/4 - (-1)^n \epsilon + n\pi/4$ with respect to said linearly polarized light;

wherein one of said retarders is a passive retarder and the other of said retarders is a liquid crystal rotatable retarder, and wherein said liquid crystal rotatable retarder is rotatable to a second orientation of $\pi/2$ with respect to said passive retarder.

2. The rotator switch of claim 1 wherein $0 \leq \epsilon \leq 5°$.

3. The rotator switch of claim 2 wherein $0 \leq \epsilon \leq 3°$.

4. The rotator switch of claim 1 wherein $\beta = 90°$.

5. The rotator switch of claim 4 wherein said liquid crystal is a Smc* liquid crystal and wherein $\alpha_1 = \pi/8 + \epsilon$ and $\alpha_2 = 3\pi/8 - \epsilon$.

6. The rotator switch of claim 5 wherein $0 \leq \epsilon \leq 3°$.

7. The rotator switch of claim 1 wherein $\beta = 45°$.

8. The rotator switch of claim 7 wherein said liquid crystal is a SmC* liquid crystal and wherein $\alpha_1 = -3\pi/16 - \epsilon$ and $\alpha_2 = 7\pi/16 + \epsilon$.

9. The rotator switch of claim 8 wherein $0 \leq \epsilon \leq 3°$.

10. The rotator switch of claim 1 wherein said liquid crystal is selected from the group consisting of SmC*, SmA*, distorted helix ferroelectric and achiral CSLCs.

11. The rotator switch of claim 1 wherein said liquid crystal is a SmC* liquid crystal.

12. The rotator switch of claim 1 wherein said passive retarder is a stretched polymer retarder.

13. The rotator switch of claim 1 wherein said passive retarder is a polymer liquid crystal retarder.

14. An achromatic shutter comprising the rotator switch of claim 1 and further comprising a first linear polarizer, positioned before said rotator switch and oriented at 0°, and a second linear polarizer, positioned after said rotator switch.

15. The achromatic shutter of claim 14 wherein said second polarizer is oriented parallel or perpendicular to said first polarizer.

16. The achromatic shutter of claim 15 wherein $\beta=90°$.

17. The achromatic shutter of claim 16 wherein said liquid crystal is a SmC* liquid crystal and wherein $\alpha_1=\pi/8+\epsilon$ and $\alpha_2=3\pi/8-\epsilon$.

18. The achromatic shutter of claim 17 wherein $0 \leq \epsilon \leq 3°$.

19. The achromatic shutter of claim 16 wherein $0 \leq \epsilon \leq 5°$.

20. The achromatic shutter of claim 19 wherein $0 \leq \epsilon \leq 3°$.

21. The achromatic shutter of claim 16 wherein said liquid crystal is selected from the group consisting of SmC*, SmA*, distorted helix ferroelectric and achiral CSLCs.

22. The achromatic shutter of claim 16 wherein said liquid crystal is a SmC* liquid crystal.

23. The achromatic shutter of claim 16 wherein said passive retarder is a stretched polymer retarder.

24. The achromatic shutter of claim 16 wherein said passive retarder is a polymer liquid crystal retarder.

25. The achromatic shutter of claim 16 wherein said second polarizer is a polarizing beamsplitter.

26. The achromatic shutter of claim 16 wherein said liquid crystal retarder is a multipixel liquid crystal retarder.

27. A polarization interference filter comprising the achromatic shutter of claim 16 and further comprising a second passive retarder, positioned between said rotator switch and said second polarizer.

28. The polarization interference filter of claim 27 wherein said second passive retarder is oriented at ±45° with respect to said first polarizer.

29. The polarization interference filter of claim 27 further comprising a third linear polarizer positioned after said second polarizer, and a third passive retarder positioned between said third polarizer and said second polarizer.

30. A split-element filter comprising the polarization interference filter of claim 28 and further comprising a third passive retarder, positioned between said second passive retarder and said second polarizer and oriented parallel or perpendicular to said first polarizer, and a fourth passive retarder having retardance equal to said second passive retarder, positioned between said third passive retarder and said second polarizer and oriented at ±45° with respect to said first polarizer.

31. A polarization switch comprising the rotator switch of claim 1 and further comprising a first linear polarizer, positioned before said rotator switch and oriented at 0°.

32. The polarization switch of claim 31 wherein $\beta=90°$.

33. A color filter comprising the polarization switch of claim 32 and further comprising a second linear polarizer, positioned after said rotator switch and oriented parallel or perpendicular to said first polarizer, wherein said first or said second polarizer is a color polarizer.

34. The color filter of claim 33 wherein said color polarizer is a pleochroic linear polarizer.

35. The color filter of claim 33 wherein said color polarizer comprises a neutral linear polarizer and a retarder stack positioned between said neutral linear polarizer and said rotator switch, wherein the number of retarders in said stack and the retardances and orientations of said retarders are such that an additive primary color spectrum is transmitted along a first polarization axis and the complementary subtractive primary color spectrum is transmitted along a second, orthogonal, polarization axis.

36. The color filter of claim 33 wherein said first and said second polarizers are both color polarizers.

37. The color filter of claim 33 further comprising a second rotator switch, positioned after said second polarizer and a third linear polarizer, positioned after said second rotator switch and oriented parallel or perpendicular to said first polarizer.

38. The color filter of claim 37 wherein said third polarizer is a color polarizer.

39. A handedness switch comprising the rotator switch of claim 4 and further comprising a quarter-wave retarder positioned after said rotator switch and oriented at 45° with respect to said linearly polarized light.

40. A color filter comprising the handedness switch of claim 39 and further comprising a first cholesteric circular polarizer positioned after said quarter-wave retarder.

41. The color filter of claim 40 further comprising a second cholesteric color polarizer positioned after said first cholesteric color polarizer.

42. An achromatic shutter comprising the rotator switch of claim 1, and further comprising a first linear polarizer, positioned on a first side of said rotator switch, and a second linear polarizer, positioned on a second side of said rotator switch.

43. A polarization interference filter comprising the achromatic shutter of claim 42, and further comprising a second passive retarder positioned between said rotator switch and one of said first and second linear polarizers.

44. The polarization interference filter of claim 43, further comprising:

a third passive retarder positioned after said rotator switch, said second passive retarder and said first and second linear polarizers; and a third linear polarizer positioned after said third passive retarder.

45. A split-element filter comprising the polarization interference filter of claim 43, and further comprising:

a third passive retarder positioned after said second passive retarder, said third passive retarder oriented parallel or perpendicular to said first linear polarizer; and a fourth passive retarder positioned after said third passive retarder, said fourth passive retarder having a retardance equal to said second passive retarder.

46. A polarization switch comprising the rotator switch of claim 1, and further comprising a first linear polarizer positioned before said rotator switch.

47. A color filter comprising the polarization switch of claim 46, and further comprising a color polarizer positioned after said rotator switch.

48. An achromatic polarization rotator switch for receiving linearly polarized light oriented at 0° and rotating the received light by an angle $\beta$, comprising:

a first liquid crystal variable retarder oriented at $\alpha_1=\beta/4+(-1)^n\epsilon-n\pi/4$ with respect to said linearly polarized light, wherein n is a non-negative integer and wherein $\epsilon$ is a small angle; and a second liquid crystal variable retarder, in series with said first retarder, oriented at $\alpha_2=3\beta/4-(-1)^n\epsilon+n\pi/4$ with respect to said linearly polarized light;

wherein the retardance of said first and second variable retarders is simultaneously switchable between zero and half-wave retardance.

49. The rotator switch of claim 48 wherein $0 \leq \epsilon \leq 5°$.

50. The rotator switch of claim 49 wherein $0 \leq \epsilon \leq 3°$.

51. The rotator switch of claim 48 wherein $\beta=90°$.

52. The rotator switch of claim 48 wherein $\beta=45°$.

53. The rotator switch of claim 48 wherein said first and second liquid crystal retarders are selected from the group consisting of homogeneously aligned nematic, nematic π-cell and homeotropically aligned smectic liquid crystal retarders.

54. The rotator switch of claim 48 wherein said first and second liquid crystal retarders are nematic π-cell liquid crystal retarders.

55. An achromatic shutter comprising the rotator switch of claim 48 and further comprising a first linear polarizer, positioned before said rotator switch and oriented at 0°, and a second linear polarizer, positioned after said rotator switch.

56. The achromatic shutter of claim 55 wherein said second polarizer is oriented parallel or perpendicular to said first polarizer.

57. The achromatic shutter of claim 56 wherein $\beta=90°$.

* * * * *

UNITED STATES PATENT AND TRADEMARK OFFICE
CERTIFICATE OF CORRECTION

PATENT NO. : 5,870,159 Page 1 of 1
DATED : February 9, 1999
INVENTOR(S) : Gary D. Sharp It is certified that error appears in the above-identified patent and that said Letters Patent is hereby corrected as shown below:

Column 14,
Line 45, please delete "$\alpha_1 = \beta/4 +-1)^n \varepsilon - n\pi 4$" and insert in lieu thereof
-- $\alpha_1 = \beta/4 + (-1)^n \varepsilon - n\pi/4$ --

Signed and Sealed this

Fourth Day of November, 2003

JAMES E. ROGAN
*Director of the United States Patent and Trademark Office*